United States Patent
Kang et al.

(10) Patent No.: US 11,304,068 B2
(45) Date of Patent: Apr. 12, 2022

(54) DEVICE AND METHOD FOR BEAM MANAGEMENT IN WIRELESS COMMUNICATION SYSTEM

(71) Applicant: Samsung Electronics Co., Ltd., Suwon-si (KR)

(72) Inventors: Namkoo Kang, Suwon-si (KR); Giwon Lee, Seoul (KR); Jaehyun Hwang, Anyang-si (KR); Jin Park, Seongnam-si (KR); Kangeun Lee, Hwaseong-si (KR); Chiwoo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 91 days.

(21) Appl. No.: 16/641,200

(22) PCT Filed: Dec. 15, 2017

(86) PCT No.: PCT/KR2017/014786
§ 371 (c)(1),
(2) Date: Feb. 21, 2020

(87) PCT Pub. No.: WO2019/039669
PCT Pub. Date: Feb. 28, 2019

(65) Prior Publication Data
US 2020/0221319 A1 Jul. 9, 2020

(30) Foreign Application Priority Data

Aug. 23, 2017 (KR) ........................ 10-2017-0106790

(51) Int. Cl.
*H04W 16/28* (2009.01)
*H04L 5/00* (2006.01)
*H04W 72/04* (2009.01)

(52) U.S. Cl.
CPC ........... *H04W 16/28* (2013.01); *H04L 5/0048* (2013.01); *H04W 72/046* (2013.01)

(58) Field of Classification Search
CPC ..... H04B 7/0695; H04B 7/088; H04L 5/0048; H04W 16/28; H04W 72/046
See application file for complete search history.

(56) References Cited

U.S. PATENT DOCUMENTS

| 2016/0119043 A1 | 4/2016 | Rajagopal et al. |
| 2017/0207845 A1 | 7/2017 | Moon et al. |

(Continued)

FOREIGN PATENT DOCUMENTS

| KR | 10-2018-0060883 A | 6/2018 |
| WO | 2017/074497 A1 | 5/2017 |

OTHER PUBLICATIONS

ISA/KR, International Search Report and Written Opinion of the International Searching Authority, International Application No. PCT/KR2017/014786, dated May 15, 2018, 12 pages.

(Continued)

*Primary Examiner* — David S Huang

(57) ABSTRACT

The present disclosure relates to a $5^{th}$ generation (5G) or pre-5G communication system for supporting a higher data transmission rate beyond a $4^{th}$ generation (4G) communication system such as long-term evolution (LTE). The present disclosure relates to beam management in a wireless communication system, and an operation method of a base station may comprise the steps of: transmitting first type reference signals; receiving feedback information on the first type reference signals; transmitting information on resources for second type reference signals, which are allocated on the basis of the feedback information, to at least one terminal; and transmitting the second type reference signals through the resources, wherein the second type reference signals are transmitted using fixed transmission (Continued)

beams by the base station. The present research has been conducted with the support of the "cross-departmental giga KOREA project" of the government (the ministry of science and ICT) in 2017 (No. GK17N0100, Development for mmWave-based 5G mobile communication system).

16 Claims, 26 Drawing Sheets

(56) References Cited

U.S. PATENT DOCUMENTS

| | | | | |
|---|---|---|---|---|
| 2017/0359826 | A1* | 12/2017 | Islam | H04W 72/085 |
| 2018/0148696 | A1 | 5/2018 | Lee et al. | |
| 2019/0007116 | A1* | 1/2019 | Chang | H04B 7/0684 |
| 2019/0089435 | A1* | 3/2019 | Mondal | H04B 7/026 |
| 2020/0274666 | A1* | 8/2020 | Zhang | H04B 7/086 |

OTHER PUBLICATIONS

Astri, et al., "Discussion on downlink measurement mechanism for NR inter-cell mobility," R2-1700777, 3GPP TSG-RAN WG2 Meeting #97, Athens, Greece, Feb. 13-17, 2017, 6 pages.

Intel Corporation, "Details for DL Beam Management," R1-1707355, 3GPP TSG-RAN WG1 #89, Hangzhou, China, May 15-19, 2017, 11 pages.

Samsung, "Discussion on beam switching mechanism," R1-1612513, 3GPP TSG RAN WG1 Meeting #87, Reno, USA, Nov. 14-18, 2016, 6 pages.

Samsung, "Beam measurement and reporting," R1-1709035, 3GPP TSG RAN WG1#89, Hangzhou, China, May 15-19, 2017, 4 pages.

ZTE, "Discussion on beam recovery mechanism," R1-1707121, 3GPP TSG RAN WG1 Meeting #89, Hangzhou, P.R. China, May 15-19, 2017, 8 pages.

ZTE et al., "On CSI-RS for beam management", 3GPP TSG RAN WG1 Meeting #88, Feb. 13-17, 2017, R1-1701813, 7 pages.

Supplementary European Search Report dated Aug. 10, 2020 in connection with European Patent Application No. 17 92 2511, 18 pages.

Supplementary Partial European Search Report dated May 19, 2020 in connection with European Patent Application No. 17 92 2511, 16 pages.

Korean Intellectual Property Office, "Notice of Preliminary Rejection" dated Dec. 23, 2021, in connection with Korean Patent Application No. 10-2017-0106790, 8 pages.

Intel Corporation, "Reference Signal and Procedure for Beam Management P-1" 3GPP TSG-RAN WG1 #87, R1-1611985, Reno, USA, Nov. 14-18, 2016, 13 pages.

* cited by examiner

○ : Beam for grouped BRRSs

○ : General operation beam

DEVICE AND METHOD FOR BEAM MANAGEMENT IN WIRELESS COMMUNICATION SYSTEM

CROSS-REFERENCE TO RELATED APPLICATIONS

This application is a 371 National Stage of International Application No. PCT/KR2017/014786, filed Dec. 15, 2017, which claims priority to Korean Patent Application No. 10-2017-0106790, filed Aug. 23, 2017, the disclosures of which are herein incorporated by reference in their entirety.

BACKGROUND

1. Field

The disclosure relates generally to a wireless communication system and, more particularly, to an apparatus and a method for beam management in a wireless communication system.

This research has been conducted with the support of the "cross-departmental giga korea project" of the government (the ministry of science and ICT) in 2017 (No. GK 17N0100, development for mmWave-based 5G mobile communication system).

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'beyond 4G network' or a 'post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A 5G system that uses a broadband frequency in a high-frequency band in order to meet a high-transmission rate is being discussed. In general, when wireless communication is performed using a high frequency, a propagation path loss increases and thus a propagation arrival distance becomes relatively shorter. Accordingly, a problem of reducing service coverage is expected. In order to solve the problem, a scheme for mitigating the propagation path loss and increasing the propagation arrival distance through a beamforming technology is actively being discussed. When the beamforming technology is used, an optimal beam for communication between a base station and a terminal is selected, and an operation for selecting the optimal beam according to a channel change due to terminal movement should be performed properly.

SUMMARY

Based on the discussion of the above background, the disclosure provides an apparatus and a method for effectively performing a beam selection in a wireless communication system.

The disclosure provides an apparatus and a method for beam management for a terminal having high-speed mobility in a wireless communication system.

The disclosure provides an apparatus and a method for effective beam management using different types of reference signals in a wireless communication system.

The disclosure provides an apparatus and a method for determining a proper time point at which reference signals transmitted through a fixed transmission beam are transmitted in a wireless communication system.

The disclosure provides an apparatus and a method for selectively managing a beam refinement reference signal (BRRS) for a terminal having difficulty in managing an optimal beam through a beam reference signal (BRS) alone in a wireless communication system.

The disclosure provides an apparatus and a method for managing BRRS in units of groups for a plurality of terminals having high-speed mobility, located within a predetermined area in a wireless communication system.

In accordance with an aspect of the disclosure, a method of operating a base station (BS) in a wireless communication system is provided. The method includes: transmitting first type reference signals; receiving feedback information of the first type reference signals; transmitting information on resources for second type reference signals allocated based on the feedback information to at least one terminal; and transmitting the second type reference signals through the resources, wherein the second type reference signals are transmitted using a fixed transmission beam of the BS.

In accordance with another aspect of the disclosure, a method of operating a terminal in a wireless communication system is provided. The method includes: receiving first type reference signals; transmitting feedback information of the first type reference signals; receiving information on resources for second type reference signals allocated based on the feedback information; and receiving the second type reference signals through the resources, wherein the second type reference signals are transmitted using a fixed transmission beam of a base station (BS).

In accordance with another aspect of the disclosure, an apparatus of a base station (BS) in a wireless communication system is provided. The apparatus includes: a transceiver; and at least one processor connected to the transceiver, wherein the at least one processor performs control to transmit first type reference signals, receive feedback information of the first type reference signals, transmit information on resources for second type reference signals allocated based on the feedback information to the at least one terminal, and transmit the second type reference signals through the resources, and the second type reference signals are transmitted using a fixed transmission beam of the BS.

In accordance with another aspect of the disclosure, an apparatus of a terminal in a wireless communication system is provided. The apparatus includes: a transceiver; and at least one processor connected to the transceiver, wherein the at least one processor performs control to receive first type reference signals, transmit feedback information of the first type reference signals, receive information on resources for second type reference signals allocated based on the feedback information, and receive the second type reference signals through the resources, and the second type reference signals are transmitted using a fixed transmission beam of a base station (BS).

An apparatus and a method according to various embodiments of the disclosure can determine whether a terminal moves at a high speed according to a possibility of a search for an optimal beam and re-select the optimal beam through reference signals repeated at a relatively short time interval according to a mobility level of the terminal, thereby maintaining a high radio channel quality state.

Effects which can be acquired by the disclosure are not limited to the above described effects, and other effects that have not been mentioned may be clearly understood by those skilled in the art from the following description.

DETAILED DESCRIPTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

Hereinafter, the disclosure provides an apparatus and a method for beam management in a wireless communication system. Specifically, the disclosure describes a technology for selecting an optimal beam through different types of reference signals in a wireless communication system.

The terms referring to a beam, the terms referring to a signal, the terms referring to a channel, the terms referring to control information, the terms referring to network entities, and the terms referring to elements of a device are used only for convenience of description. Accordingly, the disclosure is not limited to the following terms and other terms having the same technical meaning may be used.

Further, the disclosure describes various embodiments using the terms used in some communication standards (for example, 3rd-generation partnership project (3GPP)), but this is only an example. Various embodiments of the disclosure may be easily modified and applied to other communication systems.

Figure 1:
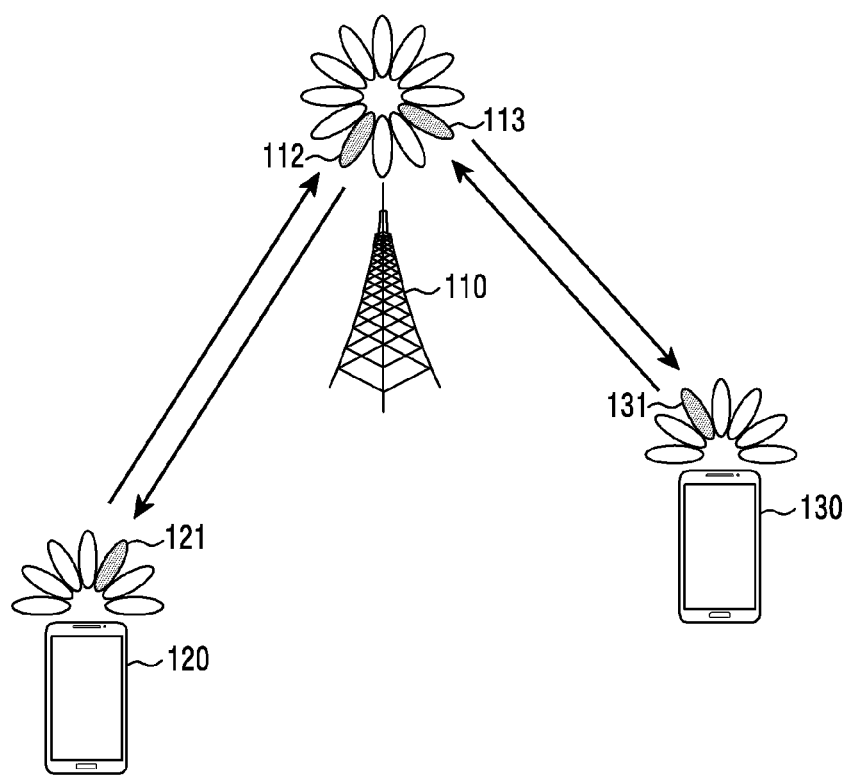
FIG. 1 illustrates a wireless communication system according to various embodiments of the disclosure.

FIG. 1 illustrates a wireless communication system according to various embodiments of the disclosure. In FIG. 1, a base station (BS) 110, a terminal 120, and a terminal 130 are illustrated as some of the nodes using a radio channel in a wireless communication system. FIG. 1 illustrates only one BS but may further include another BS, which is the same as or similar to the BS 110.

The BS 110 is a network infrastructure element that provides wireless access to the terminals 120 and 130. The BS 110 has coverage defined as a predetermined geographical region based on the distance at which a signal can be transmitted. The BS 110 may be referred to as "access point (AP)", an "evolved nodeB (eNB)", a "5$^{th}$-generation (5G) node", a "wireless point", a "transmission/reception point (TRP)", or another term having a meaning equivalent thereto, as well as "base station".

Each of the terminals 120 and 130 is a device used by a user, and performs communication with the BS 110 through a radio channel. Depending on the case, at least one of the terminals 120 and 130 may operate without user involvement. That is, at least one of the terminals 120 and 130 may be a device that performs machine-type communication (MTC), and may not be carried by the user. Each of the terminals 120 and 130 may be referred to as "user equipment (UE)", "mobile station", "subscriber station", "remote terminal", "wireless terminal", "user device", or other terms having the equivalent technical meaning, as well as "terminal".

The BS 110, the terminal 120, and the terminal 130 may transmit and receive wireless signals in millimeter-wave (mmWave) bands (for example, 28 GHz, 30 GHz, 38 GHz, and 60 GHz). At this time, in order to increase a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal or a reception signal. To this end, the BS 110 and the terminals 120 and 130 may select serving beams 112, 113, 121, and 131 through a beam search or beam management procedure. After the serving beams 112, 113, 121, and 131 are selected, communication may be performed through resources having a quasi-co-located (QCL) relationship with resources through which the serving beams 112, 113, 121, and 131 are transmitted.

The beamforming technology may be classified into transmission beamforming performed by a transmission side (for example, the BS 110 in downlink communication) and reception beamforming performed by a reception side (for example, the terminal 120 or the terminal 130 in downlink communication). In general, the transmission beamforming increases directivity by concentrating a propagation arrival area in a specific direction through a plurality of antennas, and accordingly, a signal transmission distance increases. Further, since a signal is hardly transmitted in directions other than the directed direction due to beamforming, interference which the receiving side receives from a signal of another reception side may significantly decrease. The reception side may perform the reception beamforming for a received signal using a reception antenna array. The reception beamforming may increase sensitivity of a received signal in a specific direction by concentrating radio wave reception in a specific direction and provide a gain for blocking an interference signal by excluding a signal from directions other than the specific signal from the received signal. When the beamforming is performed, an optimal beam may be changed according to terminal movement. Accordingly, the transmission side may transmit data while changing a direction of a transmission beam, and the reception side may receive data while changing a direction of a reception beam. The optimal beam may be referred to as a "preferred beam".

Figure 2:
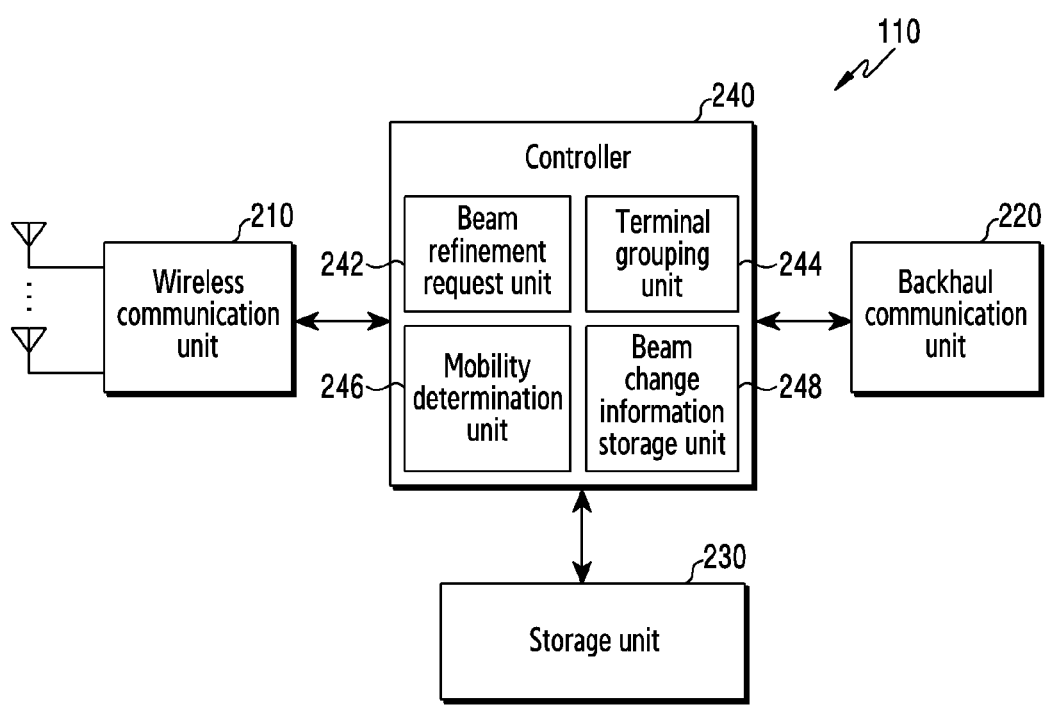
FIG. 2 illustrates the configuration of a BS in a wireless communication system according to various embodiments of the disclosure.

FIG. 2 illustrates the configuration of a BS in a wireless communication system according to various embodiments of the disclosure. The configuration illustrated in FIG. 2 may be understood as the configuration of the BS 110. The term "~unit" or "~er" used hereinafter may refer to the unit for processing at least one function or operation and may be implemented in hardware, software, or a combination of hardware and software.

Referring to FIG. 2, the BS 110 includes a wireless communication unit 210, a backhaul communication unit 220, a storage unit 230, and a controller 240.

The wireless communication unit 210 performs functions for transmitting and receiving signals through a radio channel. For example, the wireless communication unit 210 performs a function of conversion between a baseband signal and a bitstream according to a physical layer standard of the system. For example, in data transmission, the wireless communication unit 210 generates complex symbols by encoding and modulating a transmission bitstream. Also, in data reception, the wireless communication unit 210 restores a reception bitstream by demodulating and decoding a baseband signal. Also, the wireless communication unit 210 up-converts a baseband signal into a radio-frequency (RF) band signal, transmits the same through an antenna, and down-converts an RF band signal received through an antenna into a baseband signal.

To this end, the wireless communication unit 210 may include a transmission filter, a reception filter, an amplifier, a mixer, an oscillator, a digital-to-analog convertor (DAC), an analog-to-digital convertor (ADC), and the like. Further, the wireless communication unit 210 may include a plurality of transmission/reception paths. In addition, the wireless communication unit 210 may include at least one antenna array including a plurality of antenna elements. On the hardware side, the wireless communication unit 210 may include a digital unit and an analog unit, and the analog unit may include a plurality of sub-units according to operation power, operation frequency, and the like.

The wireless communication unit 210 transmits and receives the signal as described above. Accordingly, all or some of the wireless communication unit 210 may be referred to as a "transmitter", a "receiver", or a "transceiver". Also, in the following description, the transmission and reception performed through a radio channel, which is described may be understood to mean that the above-described processing is performed by the wireless communication unit 210.

The backhaul communication unit 220 provides an interface for performing communication with other nodes within the network. That is, the backhaul communication unit 220 converts a bitstream transmitted from the BS 110 to another node, for example, another access node, another BS, a higher node, or a core network, into a physical signal, and converts a physical signal received from another node into a bitstream.

The storage unit 230 stores data such as a basic program, an application, and setting information for the operation of the BS 110. The storage unit 230 may include volatile memory, nonvolatile memory, or a combination of volatile memory and nonvolatile memory. Further, the storage unit 230 provides stored data in response to a request from the controller 240.

The controller 240 controls the overall operation of the BS 110. For example, the controller 240 transmits and receives a signal through the wireless communication unit 210 or the backhaul communication unit 220. Further, the controller 240 records data in the storage unit 230 and reads the recorded data. The controller 240 may perform the functions of a protocol stack required for communication standards. To this end, the controller 240 may include at least one processor.

According to various embodiments, the controller 240 may include at least one of a beam refinement request unit 242, a terminal grouping unit 244, a mobility determination unit 246, and a beam change information storage unit 248. When high mobility of the terminal is determined, the beam refinement request unit 242 may perform control to process an additional measurement procedure using another reference signal having a different characteristic from that of a periodically transmitted reference signal. For example, the beam refinement request unit 242 may generate control information for triggering the additional measurement procedure. The terminal grouping unit 244 may select and group terminals to perform the additional measurement procedure on the basis of information on geographical features within the coverage and mobility information of the terminal. The mobility determination unit 246 determines mobility of the terminal on the basis of information related to a change in the transmission beam. The beam change information storage unit 248 may store information required for determining mobility. For example, the beam change information storage unit 248 may record information on a change in a transmission beam changed according to the measurement result, for example, identification information of the changed beam, a time at which the beam is changed, and identification information of a serving cell. The beam refinement request unit 242, the terminal grouping unit 244, the mobility determination unit 246, and the beam change information storage unit 248 are an instruction set or code stored in the storage unit 230, and may be instructions/code residing at least temporarily in the controller 240, storage spaces that store the instructions/code, or parts of the circuitry included in the controller 240. According to various embodiments, the controller 240 may control the BS 110 to perform operations according to various embodiments described below.

Figure 3:
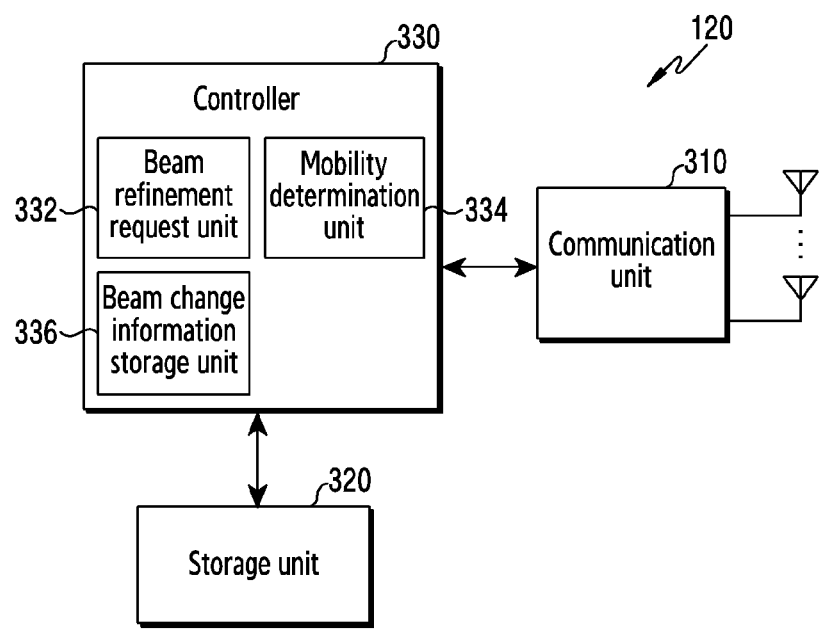
FIG. 3 illustrates the configuration of a terminal in a wireless communication system according to various embodiments of the disclosure.

FIG. 3 illustrates a configuration of the terminal in a wireless communication system according to various embodiments of the disclosure. The configuration illustrated in FIG. 3 may be understood as the configuration of the terminal 120. The term "~unit" or "~er" used hereinafter may refer to the unit for processing at least one function or operation and may be implemented in hardware, software, or a combination of hardware and software.

Referring to FIG. 3, the terminal 120 includes a communication unit 310, a storage unit 320, and a controller 330.

The communication unit 310 performs functions for transmitting/receiving a signal through a radio channel. For example, the communication unit 310 performs a function of conversion between a baseband signal and a bitstream according to a physical layer standard of the system. For example, in data transmission, the communication unit 310 generates complex symbols by encoding and modulating a transmission bitstream. Also, in data reception, the communication unit 310 restores a reception bitstream by demodulating and decoding a baseband signal. Also, the communication unit 310 up-converts a baseband signal into a RF band signal, transmits the same through an antenna, and down-converts an RF band signal received through an antenna into a baseband signal. For example, the communication unit 310 may include a transmission filter, a reception filter, an amplifier, a mixer, an oscillator, a DAC, an ADC, and the like.

Further, the communication unit 310 may include a plurality of transmission/reception paths. In addition, the communication unit 310 may include at least one antenna array including a plurality of antenna elements. On the hardware side, the communication unit 310 may include a digital circuit and an analog circuit (for example, a radio frequency integrated circuit: RFIC). The digital circuit and the analog circuit may be implemented as one package. The communication unit 310 may include a plurality of RF chains. The communication unit 310 may perform beamforming.

The communication unit 310 transmits and receives the signal as described above. Accordingly, all or some of the communication unit 310 may be referred to as a "transmitter", a "receiver", or a "transceiver". Also, in the following description, the transmission and reception performed through a radio channel may be understood to mean that the above-described processing is performed by the communication unit 310.

The storage unit 320 stores data such as a basic program, an application program, and setting information for the operation of the terminal 120. The storage unit 320 may include volatile memory, nonvolatile memory, or a combination of volatile memory and nonvolatile memory. Further, the storage unit 320 provides stored data in response to a request from the controller 330.

The controller 330 controls the overall operation of the terminal 120. For example, the controller 330 transmits and receives signals through the communication unit 310. Further, the controller 330 records data in the storage unit 320 and reads the recorded data. In addition, the controller 330 may perform the functions of a protocol stack required for the communication standard. To this end, the controller 330 may include at least one processor or microprocessor, or may play the part of the processor. Further, the part of the communication unit 310 or the controller 330 may be referred to as a communication processor (CP).

According to various embodiments, the controller 330 may include at least one of a beam refinement request unit 332, a mobility determination unit 334, and a beam change information storage unit 336. When high mobility of the terminal is determined, the beam refinement request unit 332 may perform control to process an additional measurement procedure using another reference signal having a different characteristic from that of a periodically transmitted reference signal. For example, the beam refinement request unit 332 may generate control information for triggering the additional measurement procedure. The mobility determination unit 334 may determine mobility of the terminal on the basis of information related to a change in a transmission beam. The beam change information storage unit 336 may store information required for determining mobility. For example, the beam change information storage unit 336 may record information on a change in a transmission beam changed according to the measurement result, for example, identification information of the changed beam, a time at which the beam is changed, and identification information of a serving cell. The beam refinement request unit 332, the mobility determination unit 334, and the beam change information storage unit 336 are an instruction set or code stored in the storage unit 330, and may be instructions/code residing at least temporarily in the controller 330, storage spaces that store instructions/code, or the part of a circuitry included in the controller 230. According to various embodiments, the controller 330 may control the terminal to perform operations according to various embodiments described below.

Figure 4A:
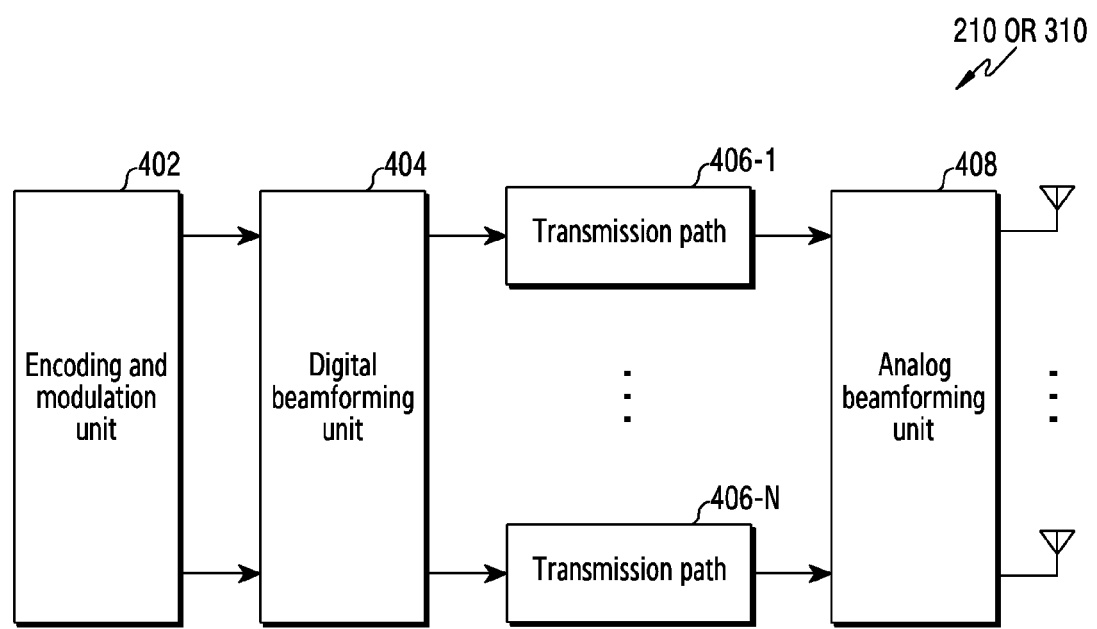
FIGS. 4A to 4C illustrate the configuration of a communication unit in a wireless communication system according to various embodiments of the disclosure.
Figure 4B:
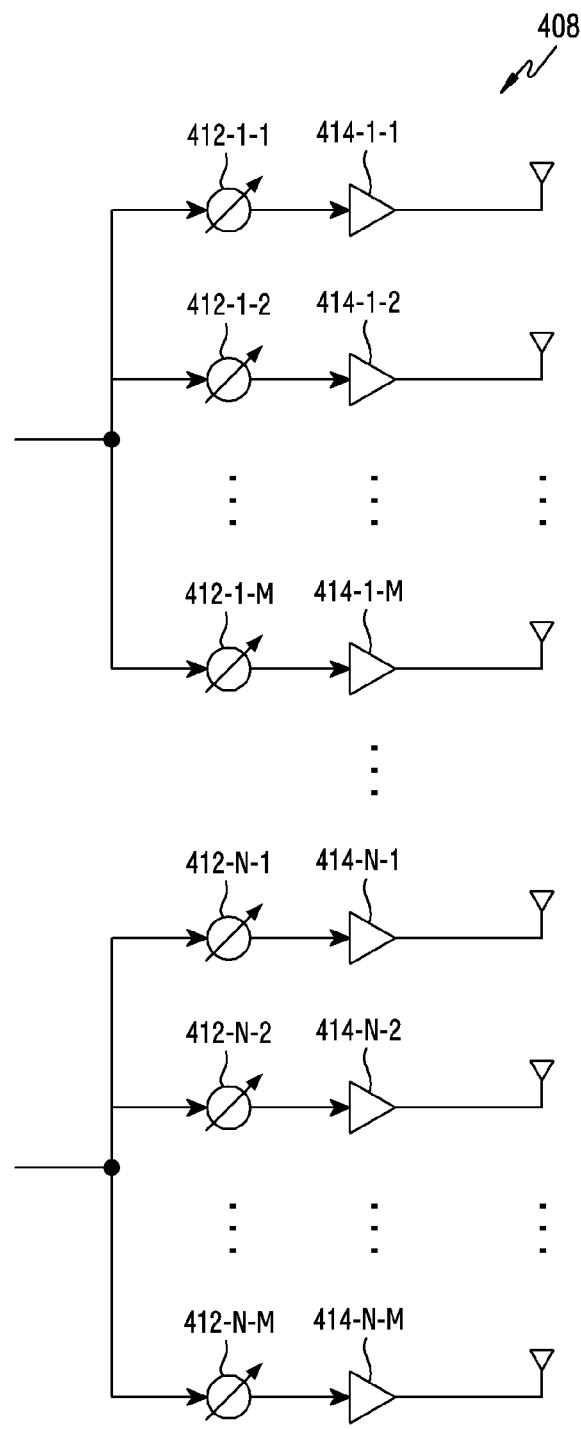
Figure 4C:
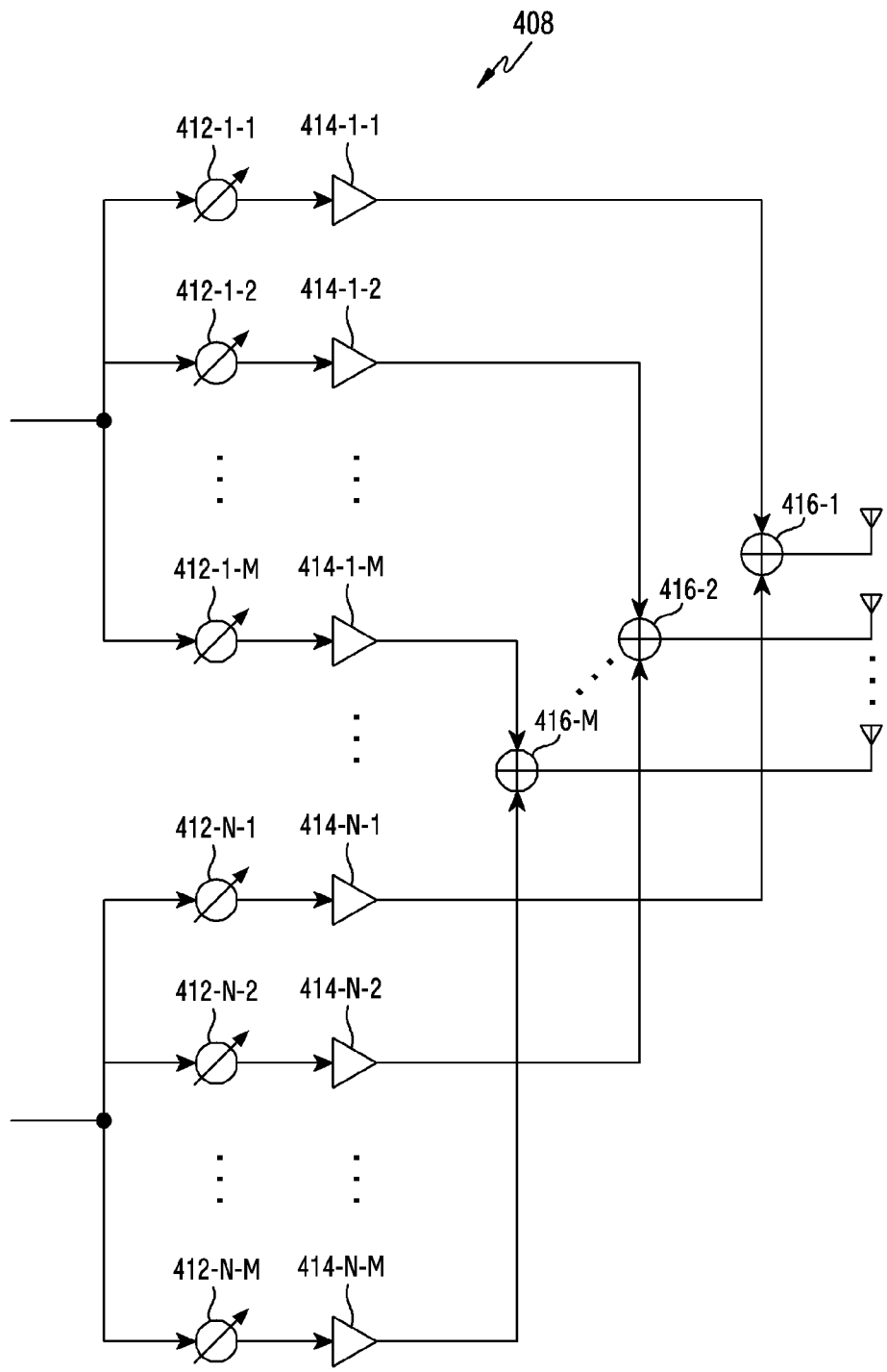

FIGS. 4A to 4C illustrate the configuration of the communication unit in the wireless communication system according to various embodiments of the disclosure. FIGS. 4A to 4C illustrate the configuration of the wireless communication unit 210 of FIG. 2 or the wireless communication unit 210 of FIG. 3 according to various embodiments of the disclosure. Specifically, FIGS. 4A to 4C illustrate elements for performing beamforming as the part of the wireless communication unit 210 of FIG. 2 or the wireless communication unit 310 of FIG. 3.

Referring to FIG. 4A, the wireless communication unit 210 or the communication unit 310 includes an encoding and modulation unit 402, a digital beamforming unit 404, a plurality of transmission paths 406-1 to 406-N, and an analog beamforming unit 408.

The encoding and modulation unit 402 performs channel encoding. For the channel encoding, at least one of a low-density parity check (LDPC) code, a convolution code, and a polar code may be used. The encoding and modulation unit 402 generates modulation symbols by performing constellation mapping.

The digital beamforming unit 404 performs beamforming on digital signals (for example, modulation symbols). To this end, the digital beamforming unit 404 multiples modulation symbols and beamforming weighted values. The beamforming weighted values may be used for changing the size and phase of the signal, and may be referred to as a "precoding matrix" or a "precoder". The digital beamforming unit 404 outputs digitally beamformed modulation symbols through the plurality of transmission paths 406-1 to 406-N. At this time, according to a multiple-input multiple-output (MIMO) transmission scheme, the modulation symbols may be multiplexed, or the same modulation symbols may be provided through the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provides independent signal-processing processes for a plurality of streams generated through the digital beamforming. However, depending on the implementation, some of the elements of the plurality of transmission paths 406-1 to 406-N may be used in common.

The analog beamforming unit 408 performs beamforming on analog signals. To this end, the digital beamforming unit 404 multiples analog signals and beamforming weighted values. The beamformed weighted values are used to change the size and phase of the signal. More specifically, the analog beamforming unit 408 may be configured as illustrated in FIG. 4B or 4C according to a connection structure between the plurality of transmission paths 406-1 to 406-N and the antennas.

Referring to FIG. 4B, signals input into the analog beamforming unit 408 may be transmitted through the antennas via phase/size conversion and amplification operation. At this time, the signals in respective paths are transmitted through different antenna sets, that is, antenna arrays. In the processing of signals input through a first path, the signals are converted into signal sequences having the same or different phase/size by phase/size conversion units 412-1-1 to 412-1-M, amplified by amplifiers 414-1-1 to 414-1-M, and transmitted through antennas.

Referring to FIG. 4C, the signals input into the analog beamforming unit 408 are transmitted through the antennas via phase/size conversion and amplification operation. At this time, the signals in respective paths are transmitted through the same antenna set, that is, antenna array. In the processing of signals input through the first path, the signals are converted into signal sequences having the same or different phase/size by the phase/size conversion units 412-1-1 to 412-1-M and amplified by the amplifiers 414-1-1 to 414-1-M. Further, in order to be transmitted through one antenna array, the amplified signals are summed up by summing units 416-1-1 to 416-1-M on the antenna element and then transmitted through the antennas.

FIG. 4B illustrates an example in which an independent antenna array is used for each transmission path, and FIG. 4C illustrates an example in which transmission paths share one antenna array. However, according to another embodiment, some transmission paths may use independent antenna arrays and the remaining transmission paths may share one antenna array. Further, according to yet another embodiment, a structure that may adaptively vary depending on the situation may be used by applying a switchable structure between transmission paths and antenna arrays.

When communication is performed using a beamforming scheme, the BS 110 and the terminal 120 may select a transmission beam direction and a reception beam direction that guarantee an optimal channel environment among various transmission beam directions and reception beam directions and transmit and receive data. For example, when the number of transmission beam directions in which the BS 110 can perform transmission is N and the number of reception beam directions in which the terminal 120 can perform reception is M, a procedure for selecting an optimal downlink transmission/reception beam direction (or beam) that guarantees the optimal channel environment is described below. The BS 110 transmits reference signals which are signals pre-arranged at least M times in each of N directions. The terminal 120 receives each of the reference signal transmitted in N directions through each of reception beams in M directions. In such a procedure, the BS 110 transmits a specific reference signal at least N×M times, and the terminal 120 also receives a reference signal N×M times and should measure reception intensity of each of the received signals. Thereafter, each of the BS 110 and the terminal 120 may select a transmission/reception beam direction corresponding to the strongest measurement value among N×M measurement values as an optimal transmission/reception beam direction.

Figure 5:
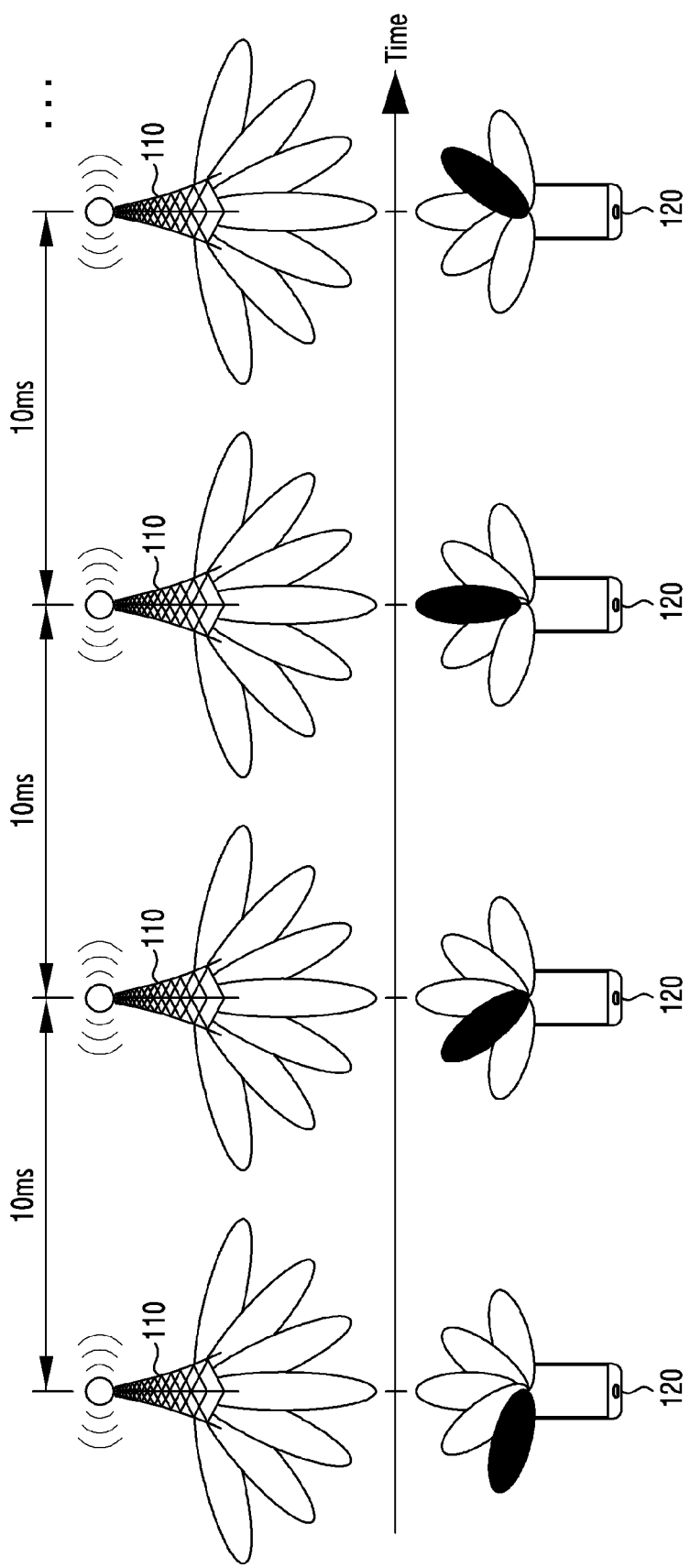
FIG. 5 illustrates an example of beam sweeping for beam selection in a wireless communication system according to various embodiments of the disclosure.

Reference signals used for the beam selection procedure may be referred to as "beam reference signals", "channel state information-reference signals (CSI-RSs), or the terminal having a technical meaning equivalent thereto. In the beam selection procedure, an operation in which the BS 110 transmits a reference signal in each of all beam directions once or more and the terminal 120 receives a reference signal in all available beam directions may be referred to as "beam sweeping". For example, beam sweeping may be performed as illustrated in FIG. 5. FIG. 5 illustrates an example of beam sweeping for beam selection in a wireless communication system according to various embodiments of the disclosure. Referring to FIG. 5, both the BS 110 and the terminal 120 perform the beam sweeping operation to find an optimal transmission/reception beam direction between the BS 110 and the terminal 120. In FIG. 5, four reference signal transmission intervals (periods) are illustrated. The BS 110 periodically transmits reference signals (for example, BRS and CSI-RS) to all terminals within a cell including the terminal 120. For example, the BS 110 may transmit reference signals according to a period of 10 ms. At this time, in each interval, the reference signals may be transmitted in all transmission beam directions. The terminal 120 may receive reference signals, which are transmitted in all transmission beam directions, in a fixed reception beam direction, measure a channel quality, and change a reception beam direction in every period. That is, the terminal 120 measures one reception beam for each interval. Thereafter, when reception beam sweeping is completed, the terminal 120 may select an optimal reception beam direction having the best channel quality. Further, the terminal 120 may feedback information on an optimal transmission beam paired with the optimal reception beam to the BS 110. Information on the optimal transmission beam may be referred to as "beam selection information (BSI)" or the term having a technical meaning equivalent thereto.

However, when the number of transmission beams and reception beams is large, it may take a long time to determine an optimal transmission/reception beam direction through beam sweeping. Accordingly, a high-speed mobile terminal of which a beam direction is rapidly changed (for example, when the mobile terminal is located within a moving vehicle), may have difficulty in operating in an optimal beam direction. In other words, when an optimal transmission/reception beam direction is determined using reference signals (for example, BRSs) which can be periodically transmitted, it may take a relatively long time. For example, when the BRS is transmitted according to a period of 10 ms and the number of reception beams of the terminal 120 is 36, 360 ms may be required for full beam sweeping. Such a long search time may act as big difficulty in supporting the terminal that rapidly moves.

Figure 6:
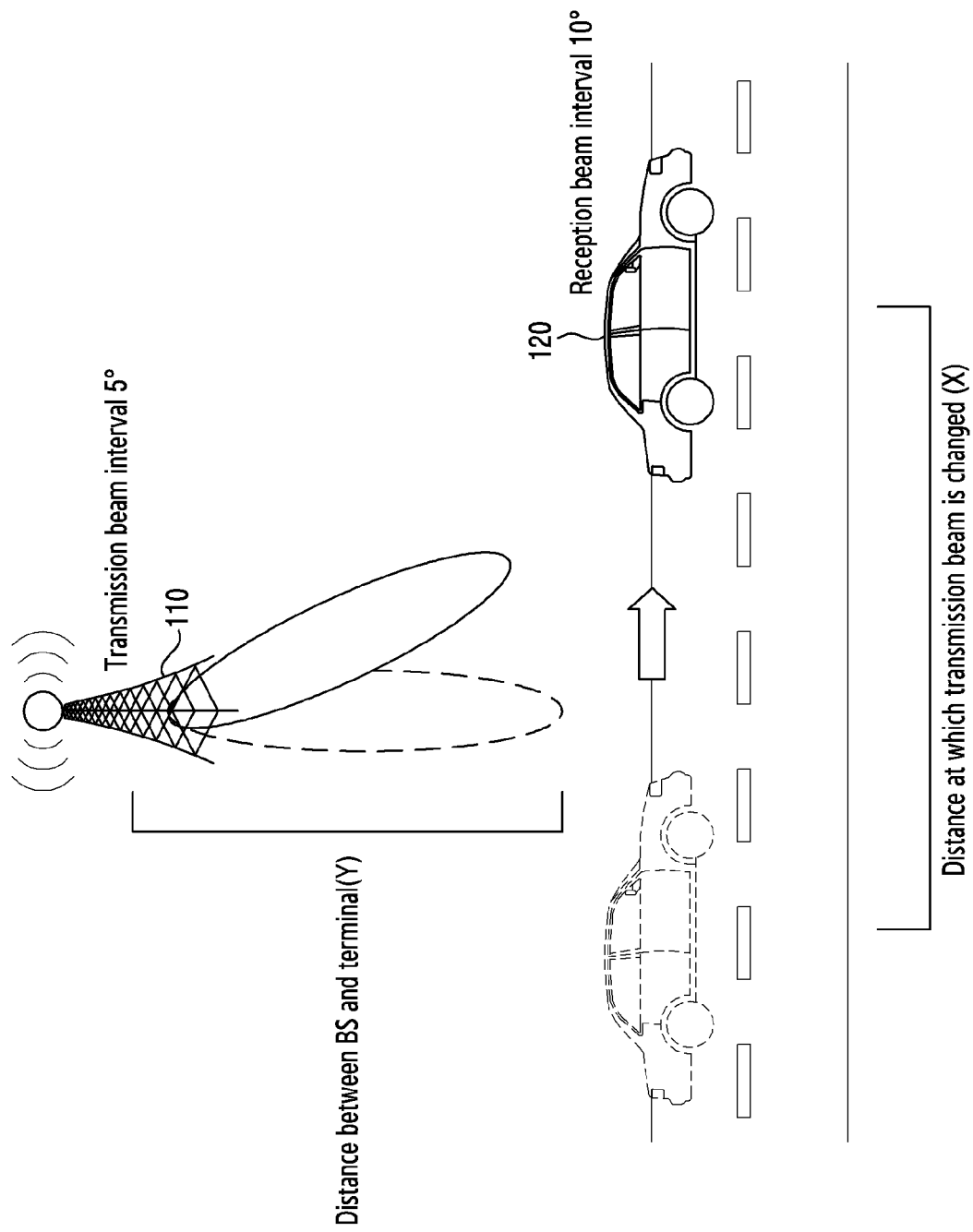
FIG. 6 illustrates an example of the configuration of required beams in consideration of movement of the terminal in a wireless communication system according to various embodiments of the disclosure.

An example of the terminal that rapidly moves is described with reference to FIG. 6. FIG. 6 illustrates an example of the configuration of required beams in consideration of movement of the terminal in a wireless communication system according to various embodiments of the disclosure. Referring to FIG. 6, a transmission beam interval of the BS 110 is 5 degrees, and a BRS period is 10 ms. A reception beam interval of the terminal 120 is 10 degrees, and the terminal 120 supports 36 reception beams to cover 360 degrees. In this case, if a vehicle moves at 60 km/h, only about 5 reception beams may be found for one transmission beam when a distance between the BS 110 and the terminal 120 is 10 ms. This means that a reception beam search rate of the terminal 120 is about 14% (5⁄36), which is very low. A reception beam search rate according to a distance at which the beam is changed is as shown in [Table 1] below.

TABLE 1

| Distance Y (m) | Distance X (m) | Time length (ms) in which same transmission beam is effective | Reception beam search rate (%) |
|---|---|---|---|
| 10 | 0.9 | 54 | 14 |
| 20 | 1.8 | 108 | 28 |
| 30 | 2.7 | 162 | 44 |

Referring to [Table 1], as the distance between the BS 110 and the terminal 12 is shorter and a movement speed of the terminal 120 is faster, the reception beam search rate becomes lower. When the reception beam search rate is continuously low, a call may be disconnected. As a result, a method of rapidly finding an optimal transmission/reception beam direction of a high-speed mobile terminal such as a vehicle is needed.

Figure 7:
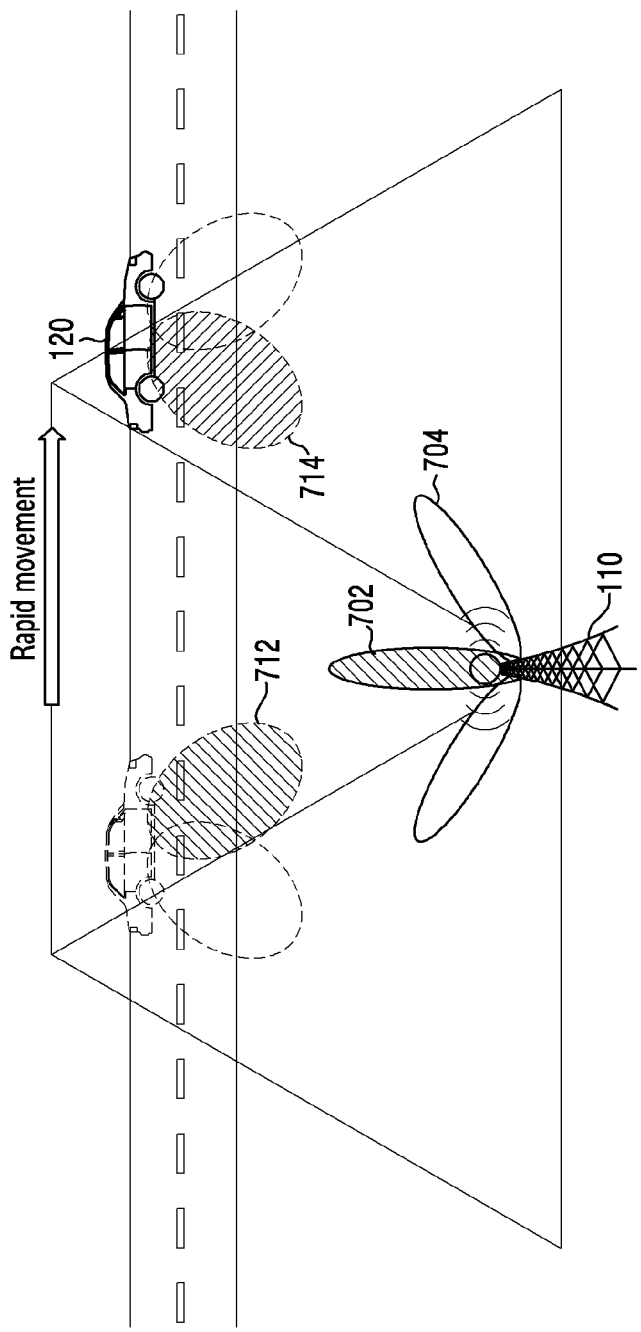
FIG. 7 illustrates an example of an optimal beam change based on movement of the terminal in a wireless communication system according to various embodiments of the disclosure.

A detailed example of a change in an optimal transmission/reception beam is described with reference to FIG. 7. FIG. 7 illustrates an example of an optimal beam change based on movement of the terminal in a wireless communication system according to various embodiments of the disclosure. FIG. 7 illustrates a situation in which an optimal beam is changed according to high-speed movement of the terminal 120. When the terminal 120 moves at a high speed, a channel environment may sharply changed even though a serving BS is maintained. For example, as illustrated in FIG. 7, an optimal beam pair at any time point may be a transmission 702 and a reception beam 712 but may be changed to a transmission beam 704 and a reception beam 714 according to movement of the terminal 120. Accordingly, in order to track the optimal beams, beam selection should be performed quickly. In a basic beam selection operation, the terminal 120 can search for a transmission beam of the BS 110 through reference signals (for example, BRSs). However, the terminal 120 generally uses one reception beam during one reference signal transmission interval in which each of the transmission beams of the BS 110 is transmitted at least once. Accordingly, when the terminal 120 measures all reception beams, reference signal transmission intervals corresponding to the number of beams of the terminal are needed. However, when the terminal 120 moves at a high speed, a time required to receive periodically transmitted reference signals through all reception beams may not be secured, and thus a method of more quickly measuring all reception beams is needed.

As described above, it is expected that there are limits on supporting the terminal having high-speed mobility through periodic reference signals alone. A method of quickly measuring reception beams is transmitting reference signals through one transmission beam by the BS and sweeping reception beams by the terminal. Accordingly, the terminal may refine reception beams of the terminal. Therefore, in order to meet requirements of quick beam measurement, the disclosure proposes various embodiments of performing an additional measurement procedure using reference signals having a different characteristic from that of the periodically transmitted reference signals.

For convenience of description, a periodically transmitted reference signal may be referred to as a "first type reference signal", a "first reference signal", or a "primary reference signal", and a reference signal having a different characteristic for an additional measurement procedure may be referred to as a "second type reference signal", a "second reference signal", or a "secondary reference signal". A difference between the first type reference signal and the second type reference signal may be at least one of periodicity, a triggering condition, an entity to fix a beam, transmission time duration, attributes of used resources, and a bandwidth. According an embodiment, the second type reference signal may be transmitted through dedicated resources allocated to a specific terminal or terminal group unlike the first type reference signal. Further, the second type reference signal may be transmitted through a fixed transmission beam during one reference signal transmission interval unlike the first type reference signal. The second type reference signal may have shorter time duration compared to the first type reference signal. The second type reference signal may be triggered on the basis of an event unlike the first type reference signal.

The first type reference signal may be a "BRS", and the second type reference signal may be a "beam refinement reference signal (BRRS)". Unlike the periodically transmitted BRS, the BRRS may be requested by the terminal or transmitted to a specific terminal by a determination of the BS as necessary. Since the BS transmits BRRSs in the state in which a transmission beam direction is fixed, the terminal may rapidly sweep reception beam directions and search for an optimal reception beam while the BRRSs are received. Further, the BRRSs are mapped at a predetermined interval in subcarrier mapping, and thus have a characteristic of being repeated within one OFDM symbol. Accordingly, a plurality of reception beams may be measured within one OFDM symbol. Transmission of the BRRS may be triggered through downlink control information (DCI) from the BS to the terminal as necessary. Alternatively, transmission of the BRRS may be requested through transmission of a scheduling request (SR) from the terminal to the BS. According to an embodiment, transmission of the BRRS may be performed for a maximum of 10 symbols within one subframe.

As described above, the BS 110 and the terminal 120 may relatively quickly find beams that provide a better quality than beams determined using the first type reference signals (for example, BRSs) by using the second type reference signals (for example, BRRSs). Specifically, the BS 110 may repeatedly transmit the second type reference signals while fixing the transmission beam and the terminal 120 may receive the second type reference signals while changing the reception beams and thus refine the reception beams. The second type reference signal may be indicated by resource allocation information (for example, DCI) to allocate dedicated resources. When the second type reference signal is transmitted, a subframe for transmitting the second type reference signal becomes a non-data subframe in which data cannot be transmitted, so that overhead is generated. Further, when the second type reference signal is triggered too late, the terminal 120 may move to an area of another beam before transmission of the second reference signals is completed, and accordingly, it is very important to start transmission of the second reference signal at the moment when it is necessary. For convenience of description, a procedure for transmitting and receiving the "first type/second type reference signals and selecting an optimal beam using the measurement result" may be referred to as a "first type/second type reference signal procedure" or a "BRS/BRRS procedure".

Figure 8:
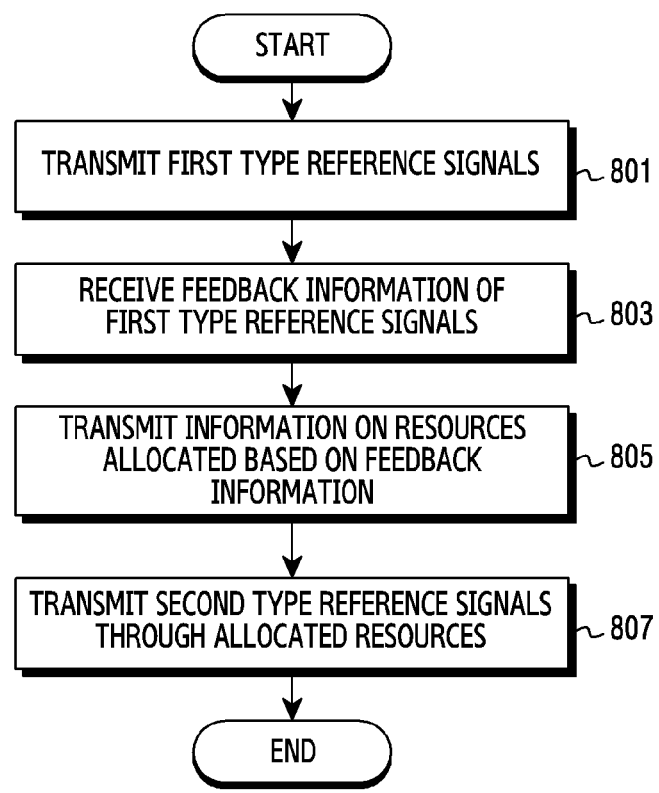
FIG. 8 is a flowchart illustrating the operation of the BS in a wireless communication system according to various embodiments of the disclosure.

FIG. 8 is a flowchart illustrating the operation of the BS in a wireless communication system according to various embodiments of the disclosure. FIG. 8 illustrates a method of operating the BS 110.

Referring to FIG. 8, in step 801, the BS transmits first type reference signals. The BS may transmit the first type reference signals according to a predefined period. At this time, the BS may transmit the first type reference signals using different transmission beams. The BS may transmit the first type reference signals through a channel (for example, a broadcasting channel or a synchronization signal) shared by a plurality of terminals. According to an embodiment, the first type reference signal transmitted through different transmission beams within one interval may include different sequences indicating beam indexes or resource indexes.

In step 803, the BS receives feedback information of the first type reference signals. The BS receives information indicating an optimal beam (for example, at least one of a transmission beam and a reception beam) selected by at least one terminal. Accordingly, the BS may determine a transmission beam to be used for communication with the corresponding terminal. At this time, according to an embodiment, the BS may determine whether to trigger a second type reference signal procedure on the basis of the currently received feedback information and previously received feedback information.

In step 805, the BS transmits information on allocated resources on the basis of feedback information. That is, the BS may determine to perform the second type reference signal procedure on the basis of the feedback information, allocate resources for transmitting the second type reference signals, and then transmit information on the allocated resources. The resources may be dedicated resources allocated to a specific terminal or terminal group. Information on the allocated resources may be the part of control information of the second type reference signal, and the control information includes information indicating a location of a subframe for transmitting the second type reference signal, a symbol location, a subcarrier location, and an antenna port. A format of the control information may be configured by higher-layer (for example, radio resource control (RRC)) signaling. According to various embodiments, the determination about whether to perform the second type reference signal procedure may depend on an independent determination of the BS, on a request from the terminal and an approval of the BS, or on an independent determination of the terminal. The determination depends on the request from the terminal or the independent determination of the terminal, the BS may receive a signal making a request for transmitting the second type reference signal from the terminal before step 805.

In step 807, the BS transmits second type reference signals through allocated resources. At this time, the BS may repeatedly transmit the second type reference signals through one transmission beam. According to an embodiment, the second type reference signals may include the same sequence. Accordingly, the terminal may re-determine a reception beam using the second type reference signals.

Figure 9:
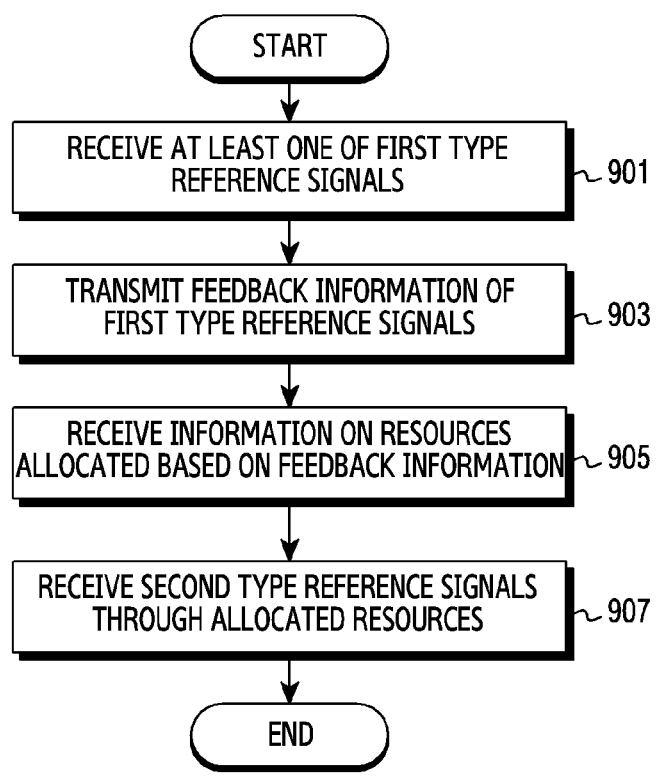
FIG. 9 is a flowchart illustrating the operation of the terminal in a wireless communication system according to various embodiments of the disclosure.

FIG. 9 is a flowchart illustrating the operation of the terminal in a wireless communication system according to various embodiments of the disclosure. FIG. 9 illustrates a method of operating the terminal 120.

Referring to FIG. 9, in step 901, the terminal receives at least one of first type reference signals. When the BS transmits the first type reference signals using different transmission beams, the terminal may receive first type reference signals transmitted through at least one transmission beams. The first type reference signals may be transmitted through a channel (for example, a broadcasting channel or a synchronization channel) shared by a plurality of terminals. According to an embodiment, the first type reference signal transmitted through different transmission beams within one interval may include different sequences indicating beam indexes or resource indexes.

In step 903, the terminal transmits feedback information of the first type reference signals. The terminal may measure a channel quality or a signal intensity of the received first type reference signals and determine an optimal transmission beam and an optimal transmission beam on the basis of the measurement result. Accordingly, the terminal transmits information indicating an optimal beam (for example, at least one of a transmission beam and a reception beam) to the BS. At this time, according to an embodiment, the BS may determine whether to trigger a second type reference signal procedure using currently transmitted feedback information and previously transmitted feedback information.

In step 905, the terminal receives information on allocated resources on the basis of the feedback information. When the BS determines to perform the second type reference signal procedure on the basis of the feedback information, the terminal may transmit information on resources allocated for the second type reference signals. At this time, the resources may be allocated to be dedicated for the terminal. Information on the allocated resources may be the part of control information of the second type reference signal, and the control information includes information indicating a location of a subframe for transmitting the second type reference signal, a symbol location, a subcarrier location, and an antenna port. A format of the control information may be configured by high-layer (for example, RRC) signaling. According to various embodiments, the determination about whether to perform the second type reference signal procedure may depend on an independent determination of the BS, on a request from the terminal and an approval of the BS, or on an independent determination of the terminal. When the determination depends on the request from the terminal or the independent determination of the terminal, the terminal may transmit a signal making a request for transmitting the second type reference signal before step 905.

In step 907, the terminal receives second type reference signals through allocated resources. The second type reference signals may be repeatedly transmitted from the BS through one transmission beam. According to an embodiment, the second type reference signals may include the same sequence. At this time, the terminal receives the second type reference signals through a plurality of reception beams. That is, the terminal may measure a plurality of reception beams and re-determine reception beams by performing reception beam sweeping.

Although not illustrated in FIGS. 8 and 9, the BS may additionally transmit a response to the second type reference signals according to an embodiment. The response may be referred to as "beam refinement information (BRI)". The response may include at least one piece of information indicating a selected optimal beam and information indicating a channel quality corresponding to an optimal beam. However, since the second type reference signal is used to refine the reception beams of the terminal, transmission of the response may be omitted according to another embodiment.

As in the embodiment described with reference to FIGS. 8 and 9, the BS and the terminal may use the second type reference signals, thereby more quickly re-determining the optimal beam compared to the case in which only the first type reference signals are used. The second type reference signal procedure may be triggered on the basis of a history of feedback information of the first type reference signals, and a more detailed triggering condition may be variously defined. Hereinafter, various embodiments of the more detailed triggering condition are provided.

According to an embodiment, the BS may detect movement of the terminal that rapidly moves like a vehicle and perform a second type reference signal procedure according to a change in an optimal transmission beam direction. In order to detect high-speed movement, the BS monitors a time point at which the optimal transmission beam direction is changed. Two examples of the change in the optimal transmission beam direction are described with reference to FIG. 10.

Figure 10:
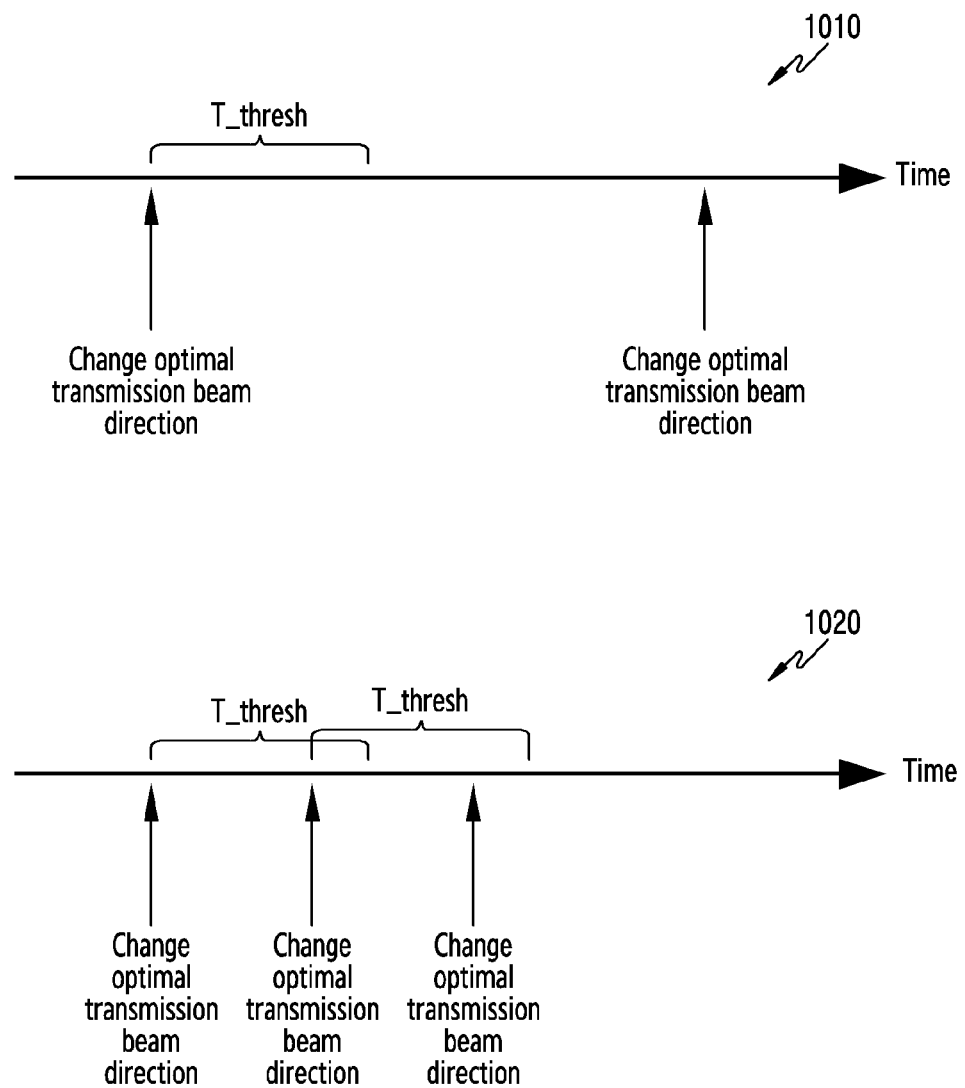
FIG. 10 illustrates examples of a period of a change in the optimal transmission beam in a wireless communication system according to various embodiments of the disclosure.

FIG. 10 illustrates examples of a period of a change in the optimal transmission beam in a wireless communication system according to various embodiments of the disclosure. For example, as indicated by reference numeral 1010, when the terminal has mobility but the optimal transmission beam is changed within a threshold time T_thresh, in other words, when the optimal transmission beam is slowly changed such that entire beam sweeping is possible, the BS may determine that the second type reference signal procedure is not needed in consideration of trade-off with throughput. However, when the optimal transmission beam is changed according to a period shorter than the threshold time (T_thresh) as indicated by reference numeral 1020, the BS may determine that the optimal beam direction is not continuously found on the basis of only the beam sweeping operation and trigger the second type reference signal procedure at a time point at which the transmission beam direction is changed. At this time, a detailed value of T_thresh may be set on the basis of a time required for entire beam sweeping, an average optimal beam search time, and service provider requirements. An embodiment of triggering the second type reference signal procedure on the basis of the period of the optimal transmission beam change will be described with reference to FIG. 11.

Figure 11:
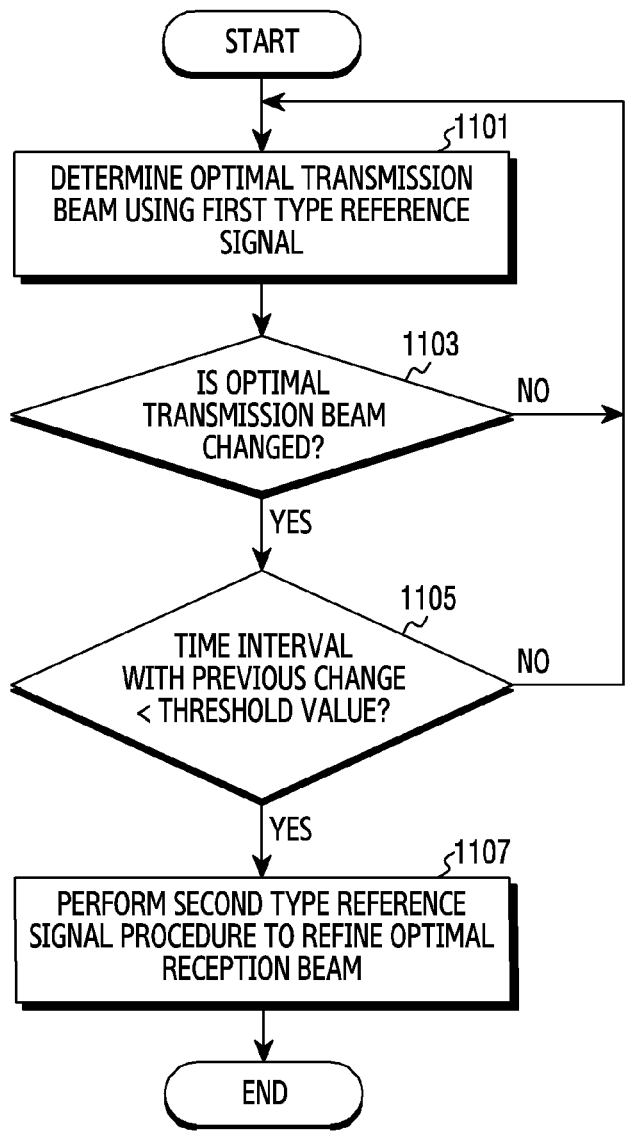
FIG. 11 is a flowchart illustrating a refinement procedure of an optimal reception beam performed by the BS according to a change in a transmission beam in a wireless communication system according to various embodiments of the disclosure.

FIG. 11 is a flowchart illustrating a refinement procedure of an optimal reception beam performed by the BS according to a change in a transmission beam in a wireless communication system according to various embodiments of the disclosure. FIG. 11 illustrates a method of operating the base station 110.

Referring to FIG. 11, in step 1101, the BS determines an optimal transmission beam of the terminal using a first type reference signal. That is, the BS transmits first type reference signals and receives information indicating an optimal transmission beam from the terminal. Accordingly, a transmission beam to be used for later communication with the terminal may be determined.

In step 1103, the BS determines whether the optimal transmission beam is changed. That is, the BS compares the previous optimal transmission of the terminal with the optimal transmission beam determined in step 1101. The optimal transmission beam may be changed by various reasons such as movement of the terminal and appearance of obstacles.

When the optimal transmission beam is changed, the BS determines whether a time interval between the previous change of the optimal transmission beam and the change determined in step 1103 is smaller than a threshold value in step 1105. In other words, the BS identifies time points at which the optimal transmission beam is recently changed two times and calculates a time interval between the identified two time points. The BS compares the calculated time interval with a threshold value. According to another embodiment, as the value compared with the threshold value, statistical data (for example, an average time interval or a change rate of the time interval) on recent three or more changes may be used instead of the time interval between the recent two changes.

When the time interval is smaller than the threshold value, the BS performs a second type reference signal procedure to refine the optimal reception beam in step 1107. That is, the BS may determine whether the optimal beam refinement is needed on the basis of the time interval for the changes in the optimal transmission beam.

According to the embodiment described with reference to FIG. 11, an additional measurement procedure for optimal reception beam refinement may be performed on the basis of the time interval for the changes in the optimal transmission beam. The embodiment of FIG. 11 is described as a method of operating the BS. However, the procedure illustrated in FIG. 11 may be performed by the terminal. In this case, step 1107 may include an operation in which the terminal makes a request for performing the second type reference signal procedure to the BS.

In the embodiment described with reference to FIG. 11, the time interval for changes in the optimal transmission beam may be understood as metric indicating a movement speed of the terminal. Accordingly, the operation (for example, step 1105) for comparing the time interval for the changes in the optimal transmission beam with the threshold value may be replaced with the operation for determining mobility of the terminal, that is, the movement speed. An embodiment in which the additional measurement procedure based on the movement speed of the terminal is performed will be described below with reference to FIG. 12.

Figure 12:
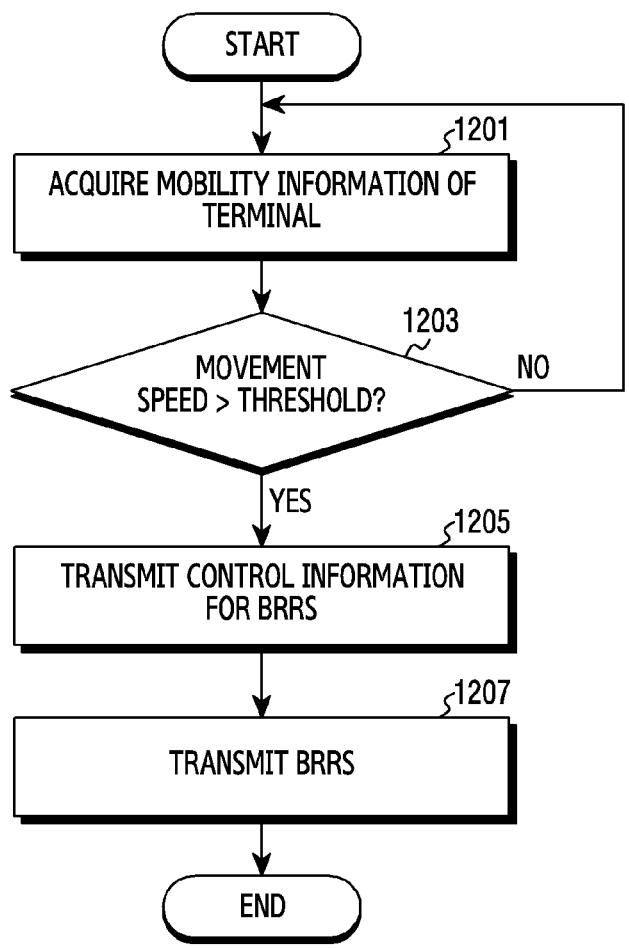
FIG. 12 is a flowchart illustrating a process in which the BS triggers a Beam Refinement Reference Signal (BRRS) procedure depending on a movement speed of the terminal in a wireless communication system according to various embodiments of the disclosure.

FIG. 12 is a flowchart illustrating a process in which the BS triggers a BRRS procedure depending on a movement speed of the terminal in a wireless communication system according to various embodiments of the disclosure. FIG. 12 illustrates a method of operating the BS 110.

Referring to FIG. 12, in step 1201, the BS acquires mobility information of the terminal. The mobility information may include a movement speed of the terminal. For example, the BS may determine mobility information on the basis of channel quality information received from the terminal and information (for example, feedback information of the BRS) indicating an optimal beam.

In step 1203, the BS determines whether the movement speed of the terminal is larger than a threshold value. When the movement speed of the terminal is larger than the threshold value, the BS transmits control information (for example, DCI) for the BRRS to the terminal in step 1205. That is, the BS triggers the BRRS procedure for the terminal. The control information may include scheduling information indicating when the BRRS is transmitted and when the UE should transmit a response to the BRRS.

In step 1207, the BS transmits BRRSs. That is, the BS transmits the BRRSs through resources indicated by the control information transmitted in step 1205. According to an embodiment, a transmission time point of the BRRSs may be right after the BRS is transmitted and feedback is received from the terminal.

According to the embodiment described with reference to FIG. 12, the second type reference signal procedure (for example, the BRRS procedure) may be triggered on the basis of the movement speed of the terminal. Accordingly, the terminal which moves at a high speed may measure second type reference signals and refine reception beams on the basis of the measurement result. To this end, the terminal sweep a plurality of reception beams.

When measuring the second type reference signals, the terminal may select reception beams to be measured. According to an embodiment, the terminal may select predefined reception beams or reception beams determined on the basis of the currently used optimal reception beam. According to another embodiment, the terminal may adaptively select reception beams to be measured according to the movement speed of the terminal. When the movement speed is relatively low, the terminal may preferentially measure reception beams having a direction adjacent to the currently used reception beam. On the other hand, when the movement speed is relatively high, the terminal may measure reception beams that do not have directions adjacent to each other. For example, when the movement speed is relatively high, the terminal may select reception beams with a predetermined spatial interval. The spatial interval may vary depending on the movement speed of the terminal.

According to another embodiment, a movement direction of the terminal may be additionally considered. By considering the movement direction, the case in which the terminal does not move, that is, the case in which the optimal transmission beam is changed in a ping-pong form may be identified.

Figure 13:
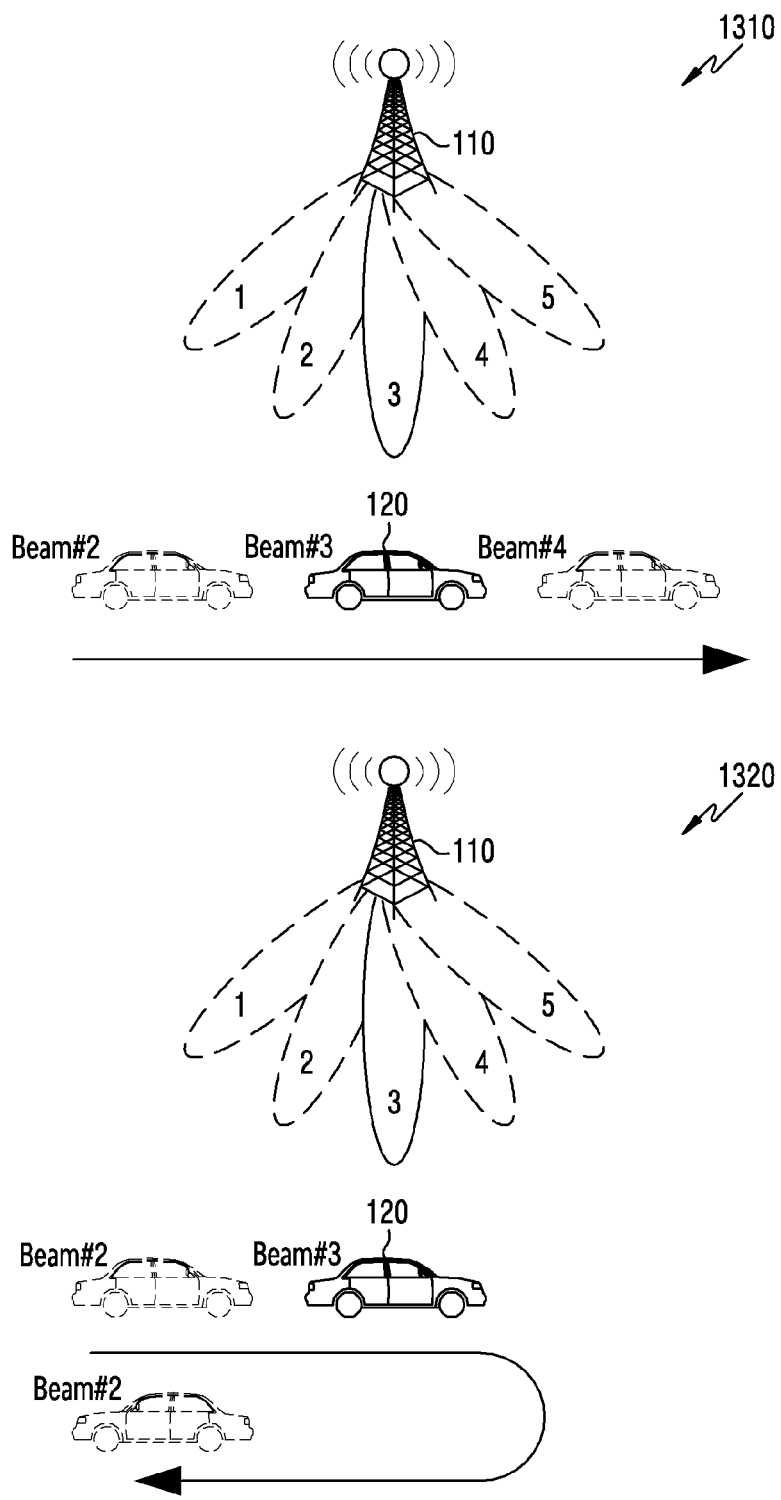
FIG. 13 illustrates examples of an optimal transmission beam change depending on directivity of movement in a wireless communication system according to various embodiments of the disclosure.

In general, when the terminal moves at a high speed by means of a vehicle, the terminal moves in a predetermined direction. In order to detect the directivity, identification information of the changed beam (for example, a beam identifier (ID), a beam index, or a resource index) may be further used in addition to a BS beam change time point. FIG. 13 illustrates examples of an optimal transmission beam change depending on directivity of movement in a wireless communication system according to various embodiments of the disclosure. If the optimal beam of the terminal is changed from the current beam to a new beam which is not the previous beam, it may be treated as movement in a predetermined direction. Specifically, when the terminal 120 selects beam #3 after beam #2 and then selects beam #4 as a transmission beam as indicated by reference numeral 1310, the BS 110 may determine that the terminal 120 is moving in a predetermined direction. On the other hand, when the optimal beam of the terminal 120 is changed from the current beam to a previously selected beam, it is not considered that the terminal is moving at a high speed and it is treated as a situation in which the transmission beam is changed in a ping-pong form without mobility from a viewpoint of beam selection. Specifically, when the terminal 120 selects beam #3 after beam #2 and then selects beam #2 as a transmission beam, the BS 110 may determine that the terminal 120 is not moving in a predetermined direction.

In addition, the case in which the terminal performs a handover to another cell and then selects a new beam may be analyzed as the case in which a direction of the transmission beam of the BS is changed on the terminal side. In this case, it is difficult to accurately determine whether the terminal moves in a predetermined direction through a change in a beam ID of the optimal transmission beam alone, and thus identification information (for example, a cell identifier (ID) of the cell may also be considered in addition to the beam ID. For example, even though the beam ID is changed back to a previous number, a change in a cell ID may be treated as movement to a new beam of another cell. That is, mobility of the terminal may also be determined on the basis of the cell ID change.

Figure 14:
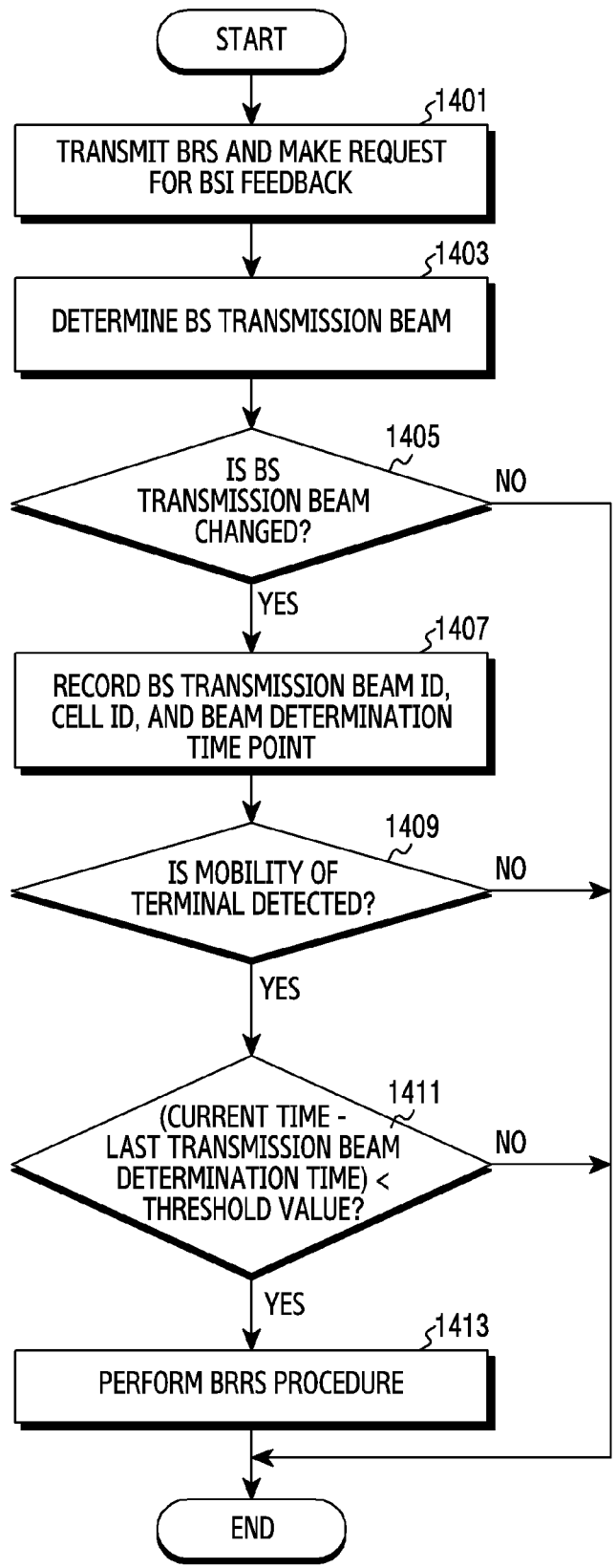
FIG. 14 is a flowchart illustrating a process in which the BS triggers a BRRS procedure depending on a movement speed and directivity of the terminal in a wireless communication system according to various embodiments of the disclosure.

FIG. 14 illustrates a procedure of performing a BRRS procedure by determining high-speed mobility of the terminal in a wireless communication system based on beamforming. According to an embodiment of FIG. 14, the BS may first transmit BRSs to terminals and then determine an optimal transmission beam direction of the BS for each of the terminals through an operation of receiving feedback of BSI. If the transmission beam direction of the BS is changed, the BS stores a beam ID, a cell ID, and a beam change time point. The BS may detect mobility of the terminal on the basis of the stored information, and may perform a BRRS procedure on the basis of a final determination about how rapidly the beam direction is changed.

FIG. 14 is a flowchart illustrating a process in which the BS triggers a BRRS procedure depending on a movement speed and directivity of the terminal in a wireless communication system according to various embodiments of the disclosure. FIG. 14 illustrates a method of operating the BS 110.

Referring to FIG. 14, in step 1401, the BS transmits BRSs and makes a request for BSI feedback. The BRSs may be transmitted through resources within a periodically arriving interval. BSI is information for informing of the measurement result of the BRSs and may be explicitly or implicitly requested. At this time, the BS may make a request for BSI feedback including information on one or more beams. Further, the BS may indicate a time point at which BSI is transmitted and resources through which BSI is transmitted.

In step 1403, the BS determines BS transmission beams for the terminal. That is, the BS determines an optimal transmission beam of the terminal on the basis of the BSI received from the terminal. At this time, the optimal transmission beam may be different from the currently used optimal transmission beam.

In step 1405, the BS determines whether the BS transmission beam is changed. For example, when the terminal moves, the optimal transmission beam may be changed. If the transmission beam is not changed, the BRRS procedure is not needed and thus the BS ends the procedure.

On the other hand, when the transmission beam is changed, the BS records a BS transmission beam ID, a cell ID, and a beam determination time point in step 1407. According to another embodiment, the handover may not be considered in which case the cell ID may be excluded from the recording.

In step 1409, the BS determines whether mobility of the terminal is detected. The BS may detect mobility of the terminal on the basis of a history of transmission beams including information recorded in step 1407 and information recorded when a previous BS transmission beam is changed. The mobility may include a movement speed and a movement direction. For example, the BS may determine the movement speed on the basis of a time interval between transmission beam changes. For example, the BS may determine a movement direction on the basis of at least a series of transmission beam IDs and cell IDs included in the recorded history.

When mobility is detected, the BS determines whether a difference between the current time and a time at which the last transmission beam is determined is smaller than a threshold time in step 1411. Detection of the mobility means that movement of the terminal in a relatively regular direction except for the case in which the transmission beam is changed in a ping-pong form. The time at which the last transmission beam is determined is a time at which the recent transmission beam change is made except for the transmission beam change identified in step 1405.

When the difference between the current time and the time at which the last transmission beam is determined is smaller than the threshold time, the BS performs the BRRS procedure in step 1413. To this end, the BS may transmit control information for triggering the BRRS procedure and transmit BRRSs through resources indicated by the control information.

Figure 15:
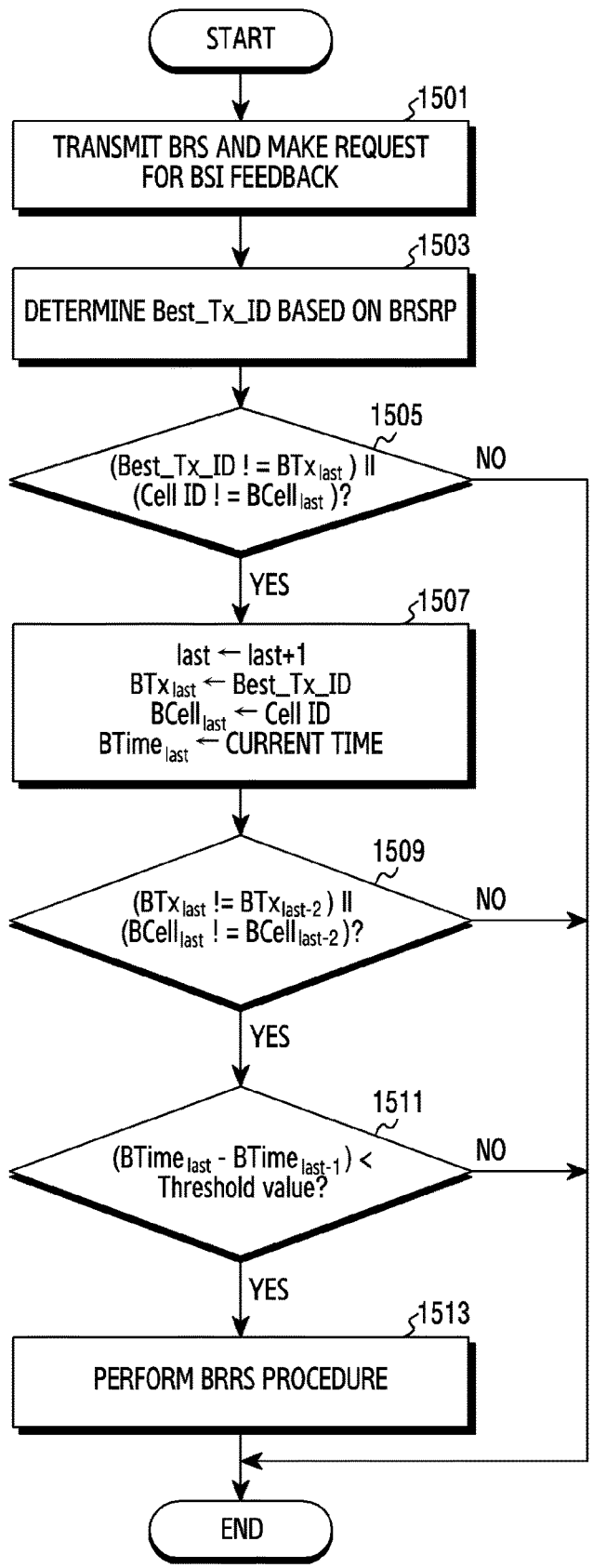
FIG. 15 is a flowchart illustrating a more detailed process in which the BS triggers the BRRS procedure depending on a movement speed and directivity of the terminal in a wireless communication system according to various embodiments of the disclosure.

FIG. 15 is a flowchart illustrating a more detailed process in which the BS triggers the BRRS procedure depending on a movement speed and directivity of the terminal in a wireless communication system according to various embodiments of the disclosure. FIG. 15 illustrates a method of operating the BS 110.

Referring to FIG. 15, in step 1501, the BS transmits BRSs and makes a request for BSI feedback. The BRSs may be transmitted through resources within a periodically arriving interval. BSI is information for informing of the measurement result of the BRSs (for example, BRS received power (BRSRP) and may be explicitly or implicitly requested. At this time, the BS may make a request for BSI feedback including information on one or more beams. Further, the BS may indicate a time point at which BSI is transmitted and resources through which BSI is transmitted.

In step 1503, the BS determines a Best_Tx_ID on the basis of the BRSRP. The Best_Tx_ID is identification information of the optimal transmission beam of the BS for the terminal. In other words, the BS determines a transmission beam having the highest BRSRP as the optimal transmission beam. That is, the BS may determine the optimal transmission beam for the terminal on the basis of BRSRP information included in BSI feedback from the terminal. At this time, the newly determined optimal transmission beam may be different from the currently used optimal transmission beam.

In step 1505, the BS determines whether the Best_Tx_ID is different from $BTx_{last}$ or whether a Cell_ID is different from $BCell_{last}$. The $BTx_{last}$ is identification information of the last optimal beam before the determination of step 1503, the Cell_ID is identification information of the current serving cell, and the $BCell_{last}$ is identification information of the serving cell when the transmission identified by the $BTx_{last}$ is used. That is, the BS determines whether the optimal transmission beam is changed or whether the serving cell is changed.

When the Best_TX_ID is different from $BTx_{last}$ or when the Cell_ID is different from $BCell_{last}$, the BS sets last to be last+1, $BTx_{last}$ to be the Best_Tx_ID, $BCell_{last}$ to be the Cell_ID, and $BTime_{last}$ to be the current time in step 1507. Here, the last is a sequence number indicating the number of beam changes and the $BTime_{last}$ is a time at which the recent beam change is made. That is, when the Best_Tx_ID is different from $BTx_{last}$ which is the last stored transmission beam ID or when the current Cell_ID is different from $BCell_{last}$ which is cell identification information corresponding to the last stored transmission beam, the BS may determine that the optimal transmission beam is changed. Accordingly, as information related to the transmission beam change, the BS records the number of transmission beam changes, identification information of the transmission beam, identification information of the cell, and a change time point.

In step 1509, the BS determines whether $BTx_{last}$ is different from $BTx_{last-2}$ or whether $BCell_{last}$ is different from $BCell_{last-2}$. In other words, the BS determines whether the last changed optimal transmission beam is the same as the last-2th changed optimal transmission beam and whether the serving cell in the last optimal transmission beam change is the same as the serving cell in the last-2th optimal transmission beam change. That is, the BS determines whether there is a ping-pong phenomenon for the optimal transmission beam.

When $BTx_{last}$ is different from $BTx_{last-2}$ or when $BCell_{last}$ is different from $BCell_{last-2}$, the BS determines whether the difference between $BTime_{last}$ and $BTime_{last-1}$ is smaller than a threshold value in step 1511. That is, the BS determines whether an optimal transmission beam change period is shorter than a threshold value. When the newly stored $BTx_{last}$ is different from $BTx_{last-2}$ which is a beam ID before two stages, the BS may determine that the terminal does not return in the previous transmission beam direction but is continuously moving to a new beam area. Accordingly, the BS identifies mobility of the terminal and determines whether the terminal is moving at a high speed on the basis of a difference between transmission beam change time points.

When the difference between $BTime_{last}$ and $BTime_{last-1}$ is smaller than a threshold value, the BS performs a BRRS procedure in step 1515. That is, when the difference between $BTime_{last}$ which is a time point at which the current optimal transmission beam is determined and $BTime_{last-1}$ which is a time point at which the previous optimal transmission beam is determined is smaller than a predetermined threshold value, the BS may determine that the terminal is moving rapidly so that it is not possible to search for the optimal beam using the BRS and thus perform the BRRS procedure. To this end, the BS may transmit control information for triggering the BRRS procedure and transmit BRRSs through resources indicated by the control information.

As described above, the BS may perform the second type reference signal procedure by detecting mobility of the terminal. Examples of signal exchange between the BS and the terminal to perform the second type reference signal procedure will be described below with reference to FIGS. 16, 17, and 18.

Figure 16:
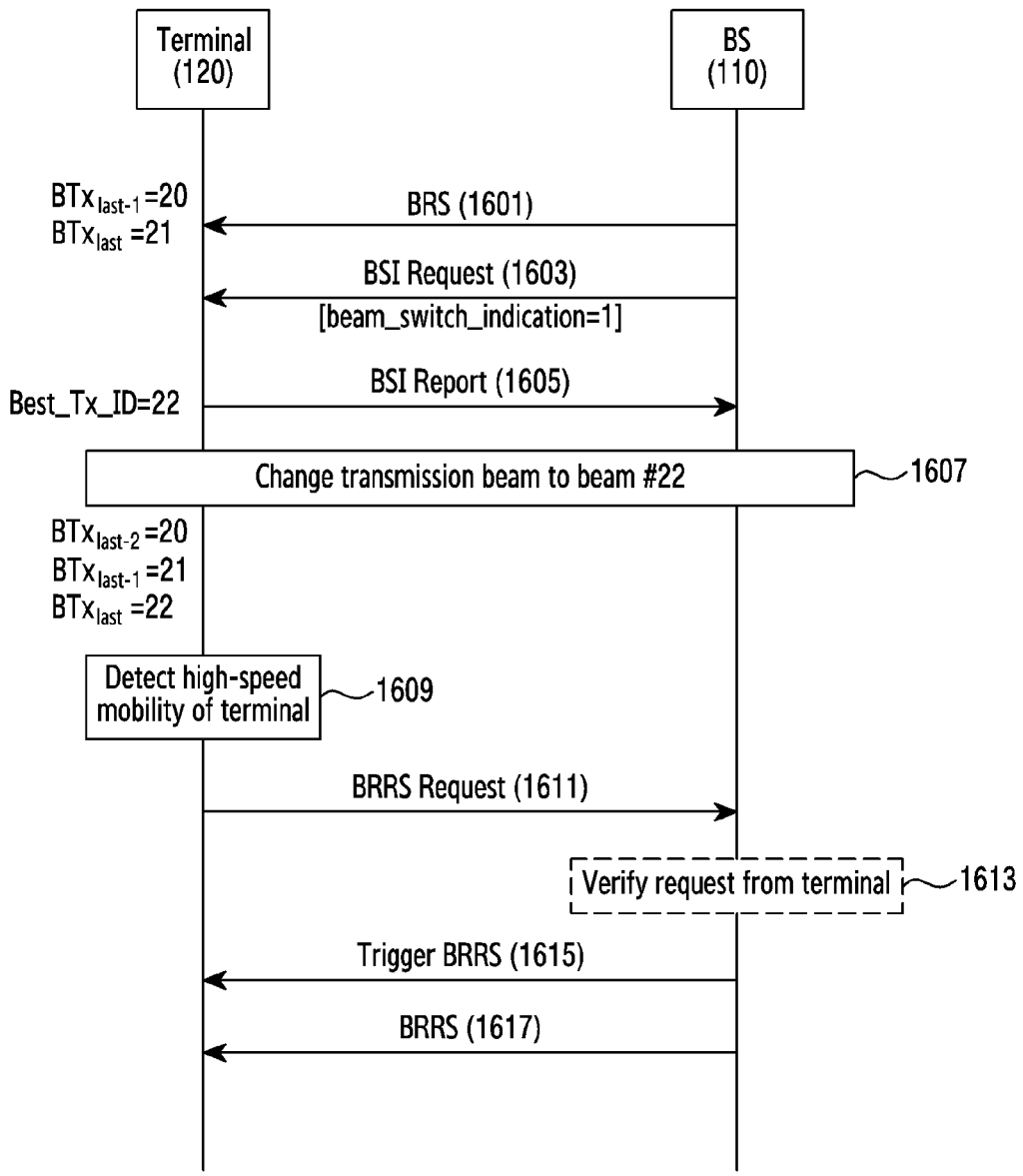
FIG. 16 illustrates signal exchange between the BS and the terminal for performing a BRRS procedure on the basis of movement of the terminal in a wireless communication system according to various embodiments of the disclosure.

FIG. 16 illustrates signal exchange between the BS and the terminal for performing a BRRS procedure on the basis of movement of the terminal in a wireless communication system according to various embodiments of the disclosure. FIG. 16 illustrates the case in which the terminal 120 moved by means of a vehicle determines high-speed mobility and makes a request for a BRRS procedure to the BS 110 through signal exchange between the BS 110 and the terminal 120.

Referring to FIG. 16, the current optimal transmission beam of the terminal 120 is beam #21 ($BTx_{last}=21$), and the previous optimal transmission beam is beam #20 ($BTx_{last-1}=20$). At this time, in step 1601, the BS 110 transmits BRSs. In step 1603, the BS 110 transmits a BSI request. That is, the BS 110 performs a periodic BRS procedure and makes a request for BSI feedback to the terminal 120. At this time, the BS may inform the terminal 120 of a change in the transmission beam direction of the BS 110 on the basis of the feedback from the terminal 120 by setting a beam switching indication (beam switch_indication) field value included in the BSI request as "1". In this embodiment, the optimal transmission beam of the BS newly determined by the terminal 120 using BRSs is beam #22.

In step 1605, the terminal 120 may inform the BS 110 of the newly determined optimal beam by transmitting a BSI report. Thereafter, in step 1607, the BS 110 changes the transmission beam to beam #22 at an appointed time point (for example, after k subframes), and the terminal 120 records information on the changed transmission beam. Accordingly, $BTx_{last-2}=20$, $BTx_{last-1}=21$, and $BTx_{last}=22$. Since the optimal transmission beam does not return to beam #20 from beam #21, the ping-pong phenomenon of the BS transmission beam may be excluded. At this time, when the change from beam #21 to beam #22 is made within a threshold time (for example, T_thresh), it may be determined that the terminal 120 has high-speed mobility in step 1609.

Accordingly, in step 1611, the terminal 120 makes a request for the BRRS procedure to the BS 110. According to an embodiment, the BRRS procedure may be requested through scheduling request (SR) signal. In step 1613, the BS 110 receiving the request of the terminal 120 verifies the request from the terminal 120 in consideration of a radio resource condition and a condition of the terminal 120. According to another embodiment, step 1613 may be omitted. As the verification is approved, the BS 110 transmits a BRRS trigger signal in step 1615. In step 1617, the BS 110 transmits BRRSs. That is, the BS 110 may trigger BRRSs through DCI and transmit the BRRSs to the terminal 120.

Figure 17:
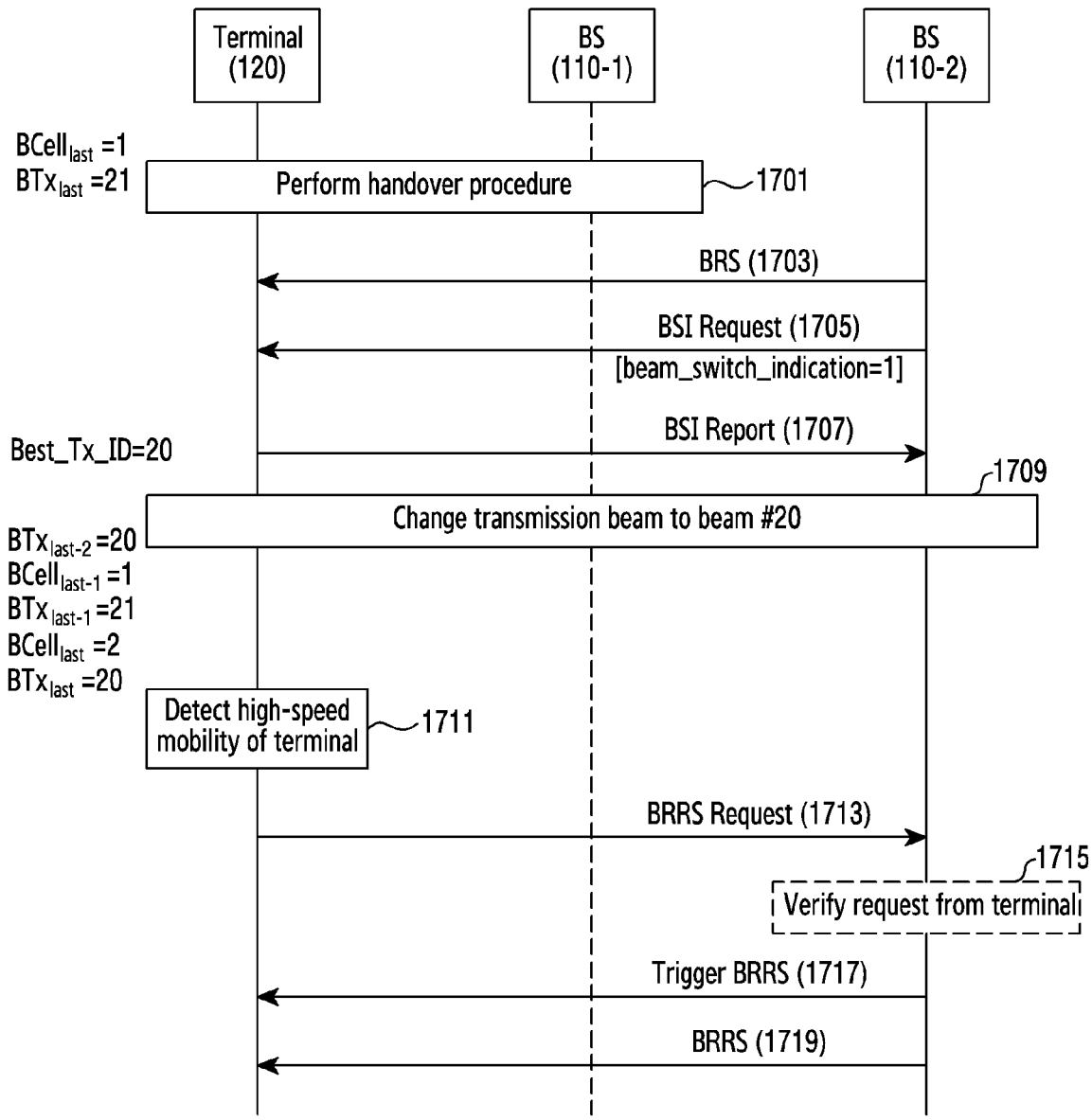
FIG. 17 illustrates signal exchange between the BS and the terminal to perform a BRRS procedure depending on a handover of the terminal in a wireless communication system according to various embodiments of the disclosure.

FIG. 17 illustrates signal exchange between the BS and the terminal to perform a BRRS procedure depending on a handover of the terminal in a wireless communication system according to various embodiments of the disclosure. FIG. 16 illustrates the case in which the terminal 120 performing the handover determines high-speed mobility and makes a request for a BRRS procedure to the BS 110 through signal exchange between a BS 110-1, a BS 110-2, and the terminal 120.

Referring to FIG. 17, the current optimal transmission beam of the terminal 120 is beam #21 ($BTx_{last}=21$), and the current serving cell is cell #1 ($BCell_{last}=1$). At this time, in step 1701, the terminal 120 performs a handover from the BS 110-1 to the BS 110-2. That is, the BS 120 performs the handover to the BS 110-2 while receiving a service from the BS 110-1 through beam #21. In step 1703, the BS 110-2 transmits BRSs. In step 1705, the BS 110-2 transmits a BSI request. That is, the BS 110-2 performs a periodic BRS procedure and makes a request for BSI feedback to the terminal 120. At this time, the BS 110-2 may inform the terminal 120 of a change in the transmission beam direction of the BS 110-2 on the basis of the feedback from the terminal 120 by setting a beam switching indication field value included in the BSI request as "1". In this embodiment, the optimal transmission beam newly determined by the terminal 120 using BRSs is beam #5 (Best_Tx_ID=5).

In step 1707, the terminal 120 may inform the BS 110-2 of the newly determined optimal transmission beam by transmitting a BSI report. Thereafter, in step 1709, the BS 110-2 changes the transmission beam to beam #20 at an appointed time point (for example, after k subframes), and the terminal 120 records information on the changed transmission beam. Accordingly, $BTx_{last-2}=20$, $BCell_{last-1}=1$, $BTx_{last-1}=21$, $BCell_{last}=2$, and $BTx_{last}=20$. Since the serving cell is changed from cell #1 to cell #2, it may be determined that the terminal 120 is moving in a new direction. That is, even though beam #20 is selected in cell #2 after beam #20 and beam #21 in cell #1, the serving cell is changed and thus the terminal may determine that the previous beam is not selected again. At this time, when a difference between a time point at which beam #21 is determined in cell #1 and a time point at which beam #20 is determined in cell #2 is smaller than a threshold time (for example, T_thresh), it may be determined that the terminal 120 has high-speed mobility in step 1711.

Accordingly, in step 1713, the terminal 120 makes a request for the BRRS procedure to the BS 110. According an embedment, the BRRS procedure may be requested through the SR signal. In step 1715, the BS 110 receiving the request of the terminal 120 verifies the request from the terminal 120 in consideration of a radio resource condition and a condition of the terminal 120. According to another embodiment, step 1715 may be omitted. As the verification is approved, the BS 110 transmits a BRRS trigger signal in step 1717. In step 1719, the BS 110 transmits BRRSs. That is, the BS 110 may trigger a BRRS procedure through DCI and transmit the BRRSs to the terminal 120.

Figure 18:
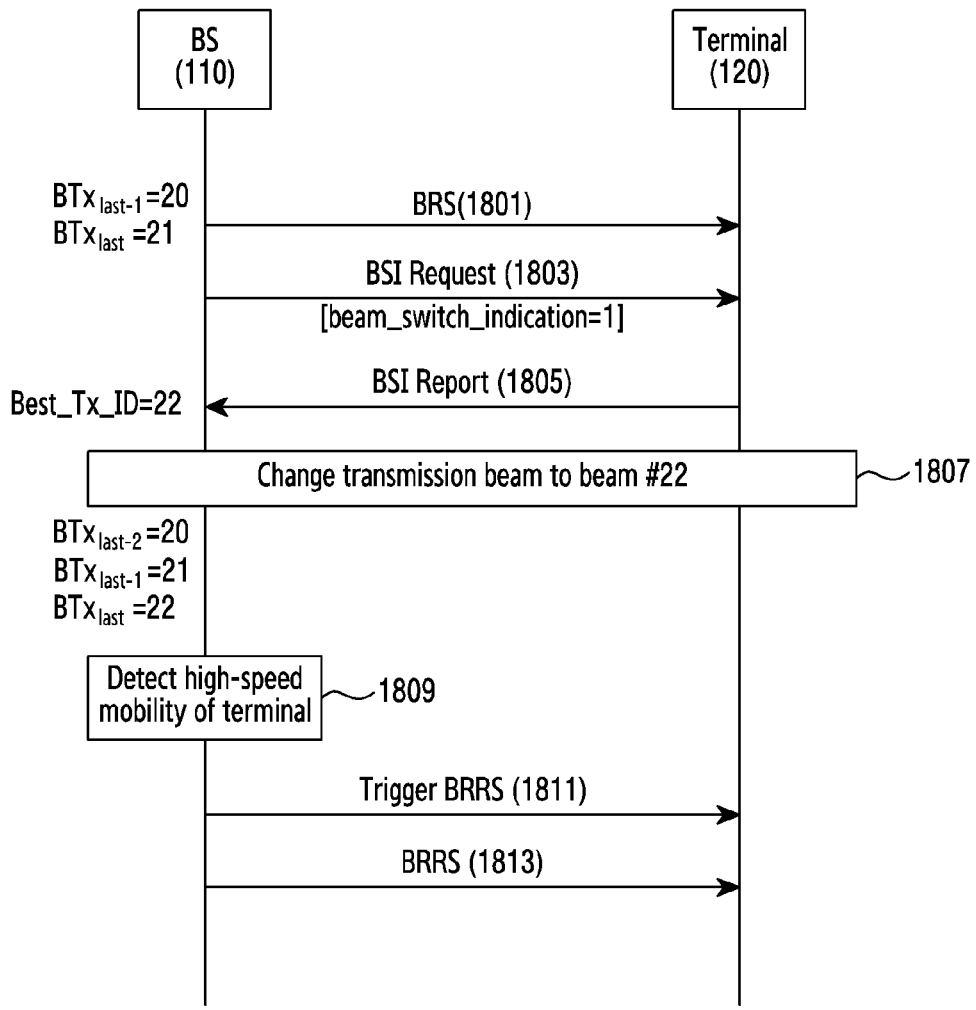
FIG. 18 illustrates other signal exchange between the BS and the terminal to perform a BRRS procedure depending on movement of the terminal in a wireless communication system according to various embodiments of the disclosure.

FIG. 18 illustrates other signal exchange between the BS and the terminal to perform a BRRS procedure depending on movement of the terminal in a wireless communication system according to various embodiments of the disclosure. FIG. 18 illustrates the case in which the BS 110 actively determines high-speed mobility of the terminal 120 and performs a BRRS procedure through signal exchange between the BS 110 and the terminal 120.

Referring to FIG. 18, the current optimal transmission beam of the terminal 120 is beam #21 ($BTx_{last}$=21), and the previous optimal transmission beam is beam #20 ($BTx_{last-1}$=20). The BS 110 may track information on movement of the terminal 120 and recognize that the optimal transmission beam of the terminal 120 is changed from beam #20 to beam #21. At this time, in step 1801, the BS 110 transmits BRSs. In step 1803, the BS 110 transmits a BSI request. That is, the BS 110 performs a periodic BRS procedure and makes a request for BSI feedback to the terminal 120. At this time, the BS may inform the terminal 120 of a change in the transmission beam direction of the BS 110 on the basis of the feedback from the terminal 120 by setting a beam switching indication field value included in the BSI request as "1". In this embodiment, the optimal transmission beam of the BS newly determined by the terminal 120 using BRSs is beam #22 (Best_Tx_ID=22).

In step 1805, the terminal 120 may inform the BS 110 of the newly determined optimal transmission beam by transmitting the BSI report. Thereafter, in step 1807, the BS 110 changes the transmission beam to beam #22 at an appointed time point (for example, after k subframes) records information on the changed transmission beam. Accordingly, $BTx_{last-2}$=20, $BTx_{last-1}$=21, and $BTx_{last}$=22. Since the optimal transmission beam does not return to beam #20 from beam #21, the ping-pong phenomenon of the BS transmission beam may be excluded. At this time, when the change from beam #21 to beam #22 is made within a threshold time (for example, T_thresh), the BS 110 may determine that the terminal 110 has high-speed mobility in step 1809.

Accordingly, the BS 110 transmits a BRRS trigger signal in step 1811. In step 1818, the BS 110 transmits BRRSs. That is, the BS 110 may trigger BRRSs through DCI and transmit the BRRSs to the terminal 120.

Like in the embodiments described with reference to FIGS. 16, 17, and 18, the BS may perform the BRRS procedure according to detection of high-speed mobility of the terminal. However, when the terminal moves at a high speed and thus a reception quality is rapidly reduced, there may be a possibility of movement of the terminal to another transmission beam area before the BRRS procedure is completed. According to another embodiment, when it is expected that the terminal moves at a high speed, the BS may periodically perform the BRRS procedure without any separate request or determination.

In the above-described various embodiments, the second type reference signal procedure or the BRRS procedure is performed for one terminal having high-speed mobility. Accordingly, the optimal transmission beam of the terminal having high-speed mobility may be rapidly refined and a communication quality may be maintained. However, the second type reference signal procedure requires allocation of dedicated resources. In other words, the second type reference signal is transmitted through a data channel (for example, a physical downlink shared channel (PDSCH)), and thus individual transmission of the second type reference signal to each terminal may causes big overhead.

Therefore, by simultaneously performing the second type reference signal procedure for a plurality of terminals having high-speed mobility, an amount of consumed resources can be reduced. For example, terminals using transmission beams of the same BS which covers an area in which terminals having high-speed mobility exist may be classified as one group, and the terminals belonging to one group may simultaneously receive grouped second type reference signals. According to another embodiment, the BS may group a plurality of terminals having high-speed mobility or expected to have high-speed mobility and perform the second type reference signal procedure through the same resources for the terminal group. Hereinafter, embodiments for performing the second type reference signal procedure for the terminal group will be described.

Figure 19:
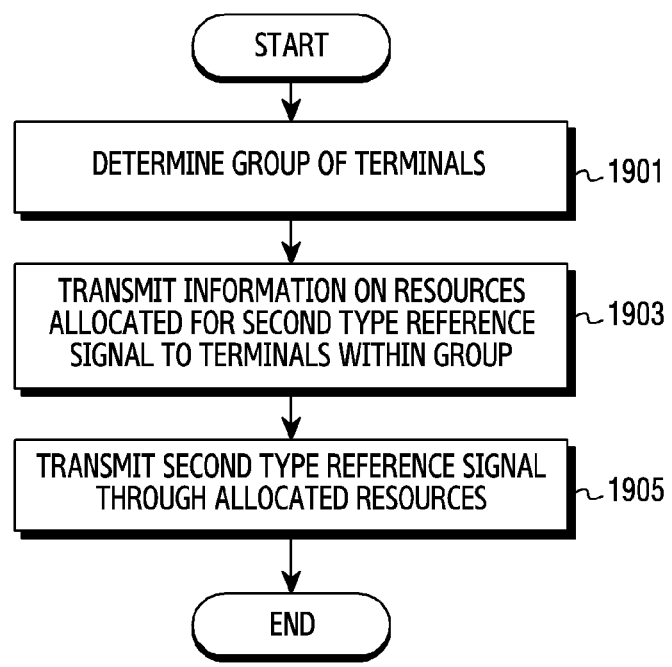
FIG. 19 is a flowchart illustrating a process in which the BS performs beam management on the basis of a group in a wireless communication system according to various embodiments of the disclosure.

FIG. 19 is a flowchart illustrating a process in which the BS performs beam management on the basis of a group in a wireless communication system according to various embodiments of the disclosure. FIG. 19 illustrates a method of operating the BS 110.

Referring to FIG. 19, in step 1901, the BS determines a group of terminals. For example, the BS may classify terminals having high-speed mobility or expected to have high-speed mobility as one group. Further, the BS may classify terminals into two or more groups according to a degree of the high-speed mobility. According to various embodiments, in order to determine or expect high-speed mobility, the BS may use geographic information of the coverage and mobility information of each of the terminals. According to an embodiment, grouping may be performed on the basis of a condition under which terminals within the corresponding group use the same BS transmission beam.

In step 1903, the BS transmits information on resources allocated for the second type reference signal to terminals within the group. That is, the BS may allocate resources to transmit second type reference signals and then transmit information on the allocated resources. At this time, the BS may transmit information on the resources to each of the terminals within the group in a unicast manner or in a multicast manner.

In step 1905, the BS transmits second type reference signals through allocated resources. At this time, the BS may repeatedly transmit the second type reference signals through one transmission beam. According to an embodiment, the second type reference signals may include the same sequence. Accordingly, each of the terminals within the group may re-determine reception beams using the second type reference signals.

Like in the embodiment described with reference to FIG. 19, the BS may perform the second type reference signal procedure for the group including a plurality of terminals. Accordingly, reception beams of the plurality of terminals may be refined through one resource interval. That is, resource overhead by the second type reference signal procedure may be reduced. At this time, grouping of the terminals may be variously performed. Hereinafter, various embodiments of grouping of terminals will be described.

For grouping of terminals, the BS may determine an area to which terminals moving at a high speed moves. The BS may search for road information in network design information, receive road information through a global position system (GPS), learn an interval in which beams of terminals are rapidly changed, or receive mobility information from terminals, thereby detecting an area in which terminals rapidly moves. When the area in which terminals having high-speed mobility exist is detected, the BS may perform the second type reference signal procedure for beams covering the detected area. At this time, no separate determination or request may be required.

Figure 20:
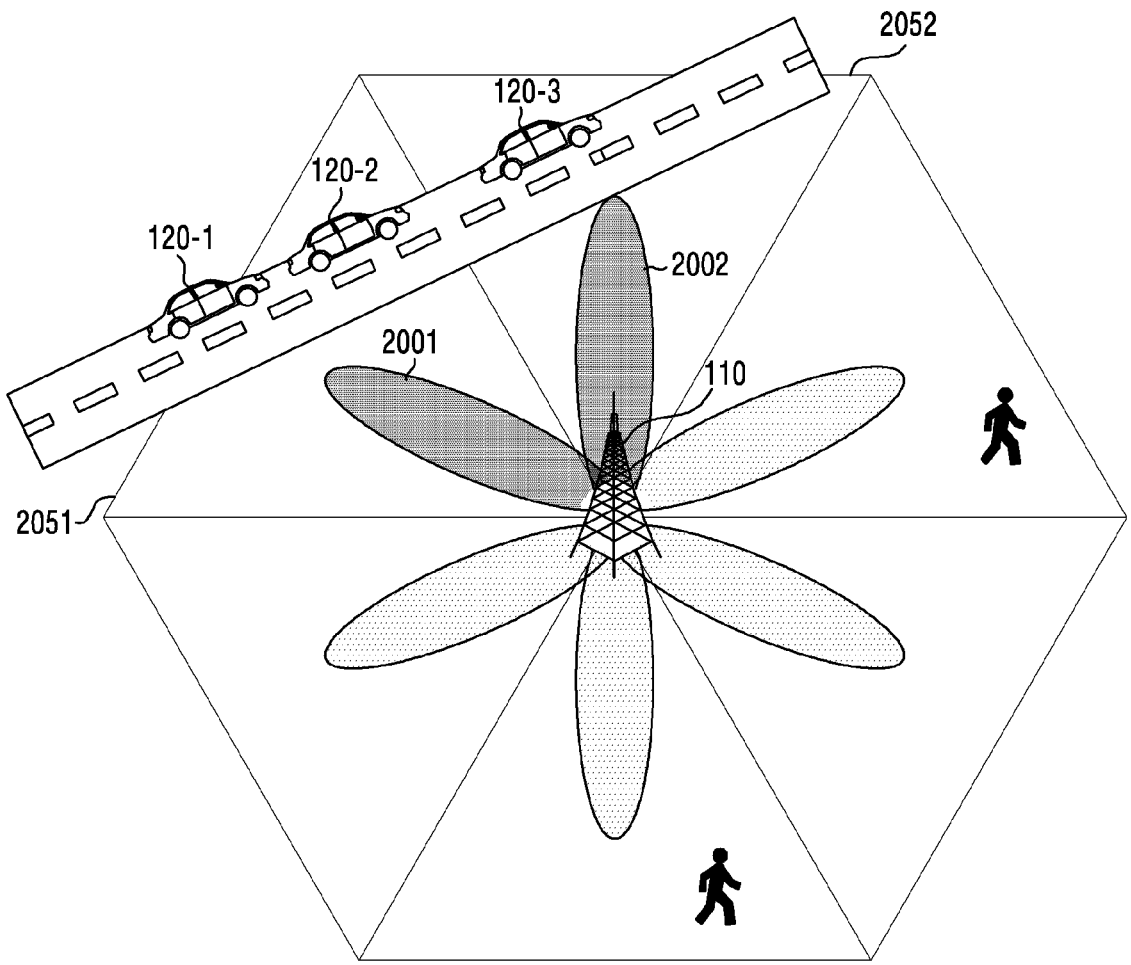
FIG. 20 illustrates an example of a situation in which a plurality of terminals having high-speed mobility is concentrated in a wireless communication system according to various embodiments of the disclosure.

An example of the area in which terminals having high-speed mobility is as illustrated in FIG. 20. FIG. 20 illustrates an example of a situation in which a plurality of terminals having high-speed mobility is concentrated in a wireless communication system according to various embodiments of the disclosure. Referring to FIG. 20, six beams of the BS 110 cover six areas. At this time, there is a road in areas 2051 and 2052. Since the road is a moving path of vehicles, is may be expected that there are terminals having high-speed mobility (for example, terminals 120-1, 120-2, and 120-3). Accordingly, the second type reference signal procedure may be periodically performed without any separate determination or request for transmission beams 2001 and 2002 covering the areas 2051 and 2052. An embodiment considering the situation as illustrated in FIG. 20 is described below with reference to FIG. 21.

Figure 21:
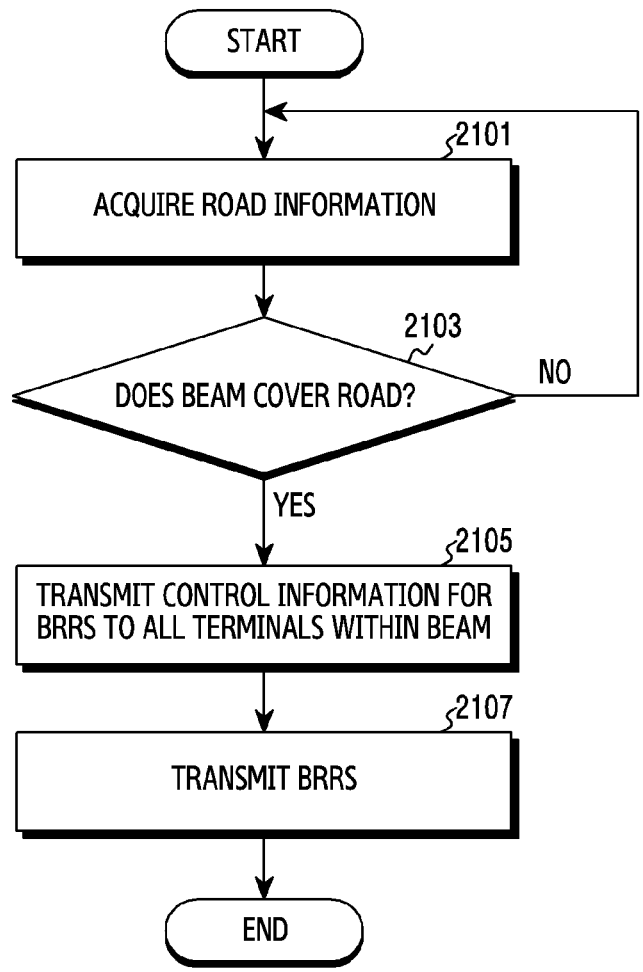
FIG. 21 is a flowchart illustrating a process in which the BS performs a BRRS procedure for a terminal group determined on the basis of geographical features in a wireless communication system according to various embodiments of the disclosure.

FIG. 21 is a flowchart illustrating a process in which the BS performs a BRRS procedure for a terminal group determined on the basis of geographical features in a wireless communication system according to various embodiments of the disclosure. FIG. 21 illustrates a method of operating the BS 110.

Referring to FIG. 21, in step 2101, the BS acquires road information. In other words, the BS identifies whether there is a road within the coverage or identifies a part of the coverage in which the road is located. For example, the BS may acquire road information using network design information, feedback from terminals, GPS information, or information provided from the outside.

In step 2103, the BS determines whether beams cover the road. That is, the BS determines whether at least one of a plurality of used transmission beams cover at least a part of the road. Specifically, the BS may acquire map data through the GPS and determine whether a specific beam covers the road on the basis of information on the road included in the map data.

When the beam covers the road, the BS transmits control information for the BRRS procedure to terminals using the corresponding transmission beam in step 2105. In other words, the BS triggers the BRRS procedure for terminals which determine the transmission beam covering at least the part of the road as an optimal downlink transmission beam. For example, the control information may be transmitted through DCI. The control information may include scheduling information indicating when the BRRS is transmitted and when the UE should transmit a BRI that is a response to the BRRS. However, according to another embodiment, the BRRS procedure is a procedure for refining the reception beam of the terminal for the fixed BS transmission beam, and thus feedback of the optimal transmission beam may be omitted in which case scheduling information of the BRI may be excluded.

In step 2107, the BS transmits the BRRS. In other words, the BS transmits the BRRS using at least one transmission beam covering the road. Although not illustrated, steps 2105 and 2107 may be periodically performed. That is, the BS may periodically transmit the BRRS without any separate request. Accordingly, reception beams of terminals moving on the road at a high speed may be more rapidly refined.

As in the embodiment described with reference to FIG. 21, the BS may perform the second type reference signal procedure for a specific transmission beam on the basis of geographical features within the coverage. Accordingly, terminals using the corresponding transmission beam may receive the same second type reference signals and measure a plurality of reception beams. Therefore, beamforming efficiency and a link gain may increase.

In the embodiment described with reference to FIG. 21, terminals are classified into one group according to movement in a specific area. In other words, terminals using a specific transmission beam are classified into one group. According to another embodiment, terminals having a movement speed higher than or equal to a threshold value may be classified into one group. An embodiment of a terminal group determined on the basis of a movement speed will be described below.

Figure 22:
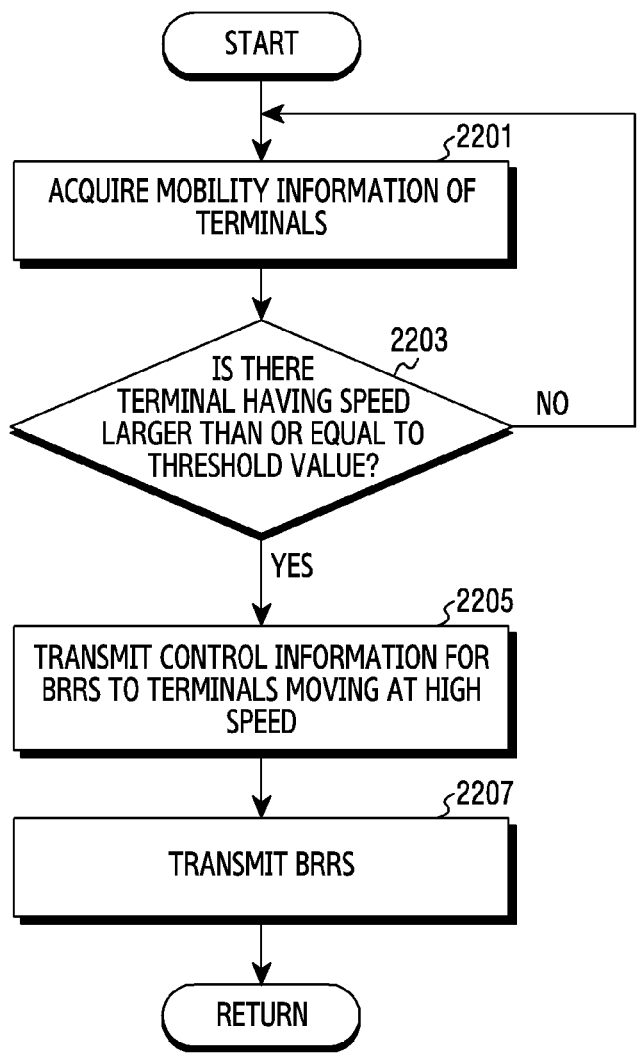
FIG. 22 is a flowchart illustrating a process in which the BS performs a BRRS procedure for a terminal group determined on the basis of a movement speed in a wireless communication system according to various embodiments of the disclosure.

FIG. 22 is a flowchart illustrating a process in which the BS performs a BRRS procedure for a terminal group determined on the basis of a movement speed in a wireless communication system according to various embodiments of the disclosure. FIG. 22 illustrates a method of operating the BS 110.

Referring to FIG. 22, in step 2201, the BS acquires mobility information of terminals. The mobility information may include at least one of a movement speed and a movement direction of the terminal. For example, the BS may determine mobility information on the basis of channel quality information received from terminals and information indicating an optimal beam (for example, feedback information of the BRS).

In step 2203, the BS determines whether there are terminals having a movement speed larger than or equal to a threshold value. When there are terminals having the movement speed larger than or equal to the threshold value, the BS transmits control information (for example, DCI) for the BRRS to the corresponding terminals, that is, terminals having high-speed mobility in step 1105. That is, the BS classifies the terminals having the movement speed larger than or equal to the threshold value as one group and triggers the BRRS procedure for the terminals within the group. The control information may include scheduling information indicating when the BRRS is transmitted and when the terminals transmit a response to the BRRS.

In step 2207, the BS transmits BRRSs. That is, the BS transmits the BRRSs through resources indicated by the control information transmitted in step 1105. At this time, when transmission beams allocated to the terminals having high-speed mobility are different, the BRRS procedure for two or more transmission beams may be sequentially performed. Although not illustrated, steps 2205 and 2207 may be periodically performed. That is, the BS may periodically transmit the BRRS without any separate request.

Figure 23:
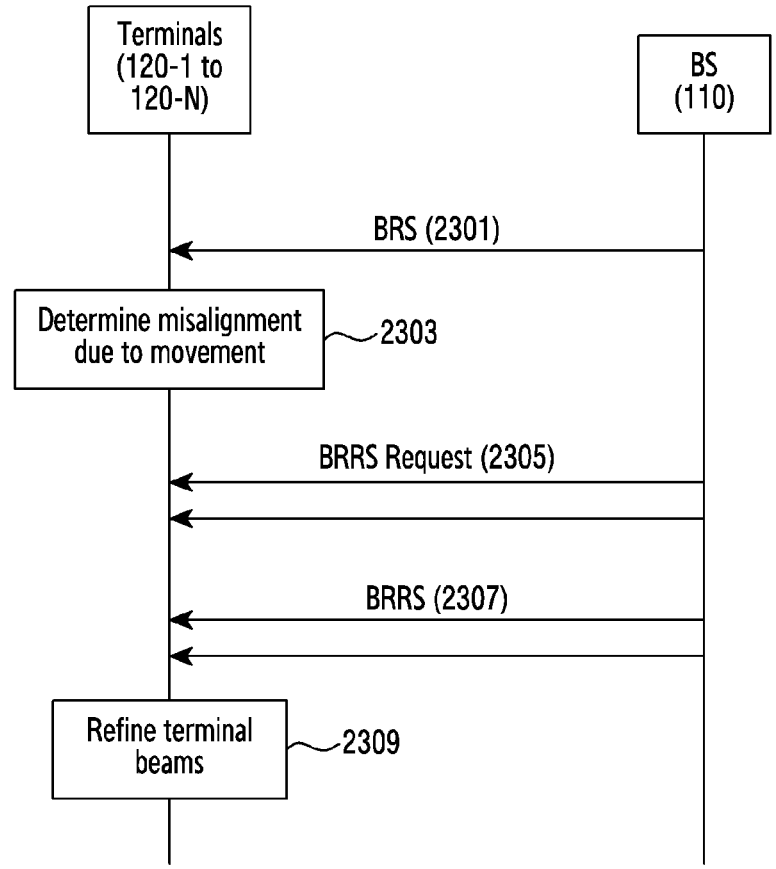
FIG. 23 is flowchart illustrating a process in which the BS performs the BRRS procedure for a terminal group determined on the basis of a movement speed in a wireless communication system according to various embodiments of the disclosure.

FIG. 23 is flowchart illustrating a process in which the BS performs the BRRS procedure for a terminal group determined on the basis of a movement speed in a wireless communication system according to various embodiments of the disclosure. FIG. 23 illustrates signal exchange between the BS 110 and terminals 120-1 to 120-N.

Referring to FIG. 23, in step 2301, the BS 110 transmits BRSs. The BRSs are transmitted through a shared channel, so that the terminals 120-1 to 120-N may measure BS transmission beams using the BRSs. In step 2303, the terminals 120-1 to 120-N determine beam misalignment due to movement. Thereafter, in step 2305, the BS 110 transmits a BRRS request to the terminals 120-1 to 120-N. For example, the BRRS request may be transmitted through DCI. Further, the BS 110 transmits BRRSs. Accordingly, the terminals 120-1 to 120-N may receive the BRRSs and measure reception beams. That is, the BS 110 transmits the BRRSs, and the terminals 120-1 to 120-N refine reception beams in step 2309. Thereafter, although not illustrated, the terminals 120-1 to 120-N may feedback the measurement result using the BRRSs to the BS. However, the feedback of the measurement result using the BRRSs may be omitted.

Figure 24:
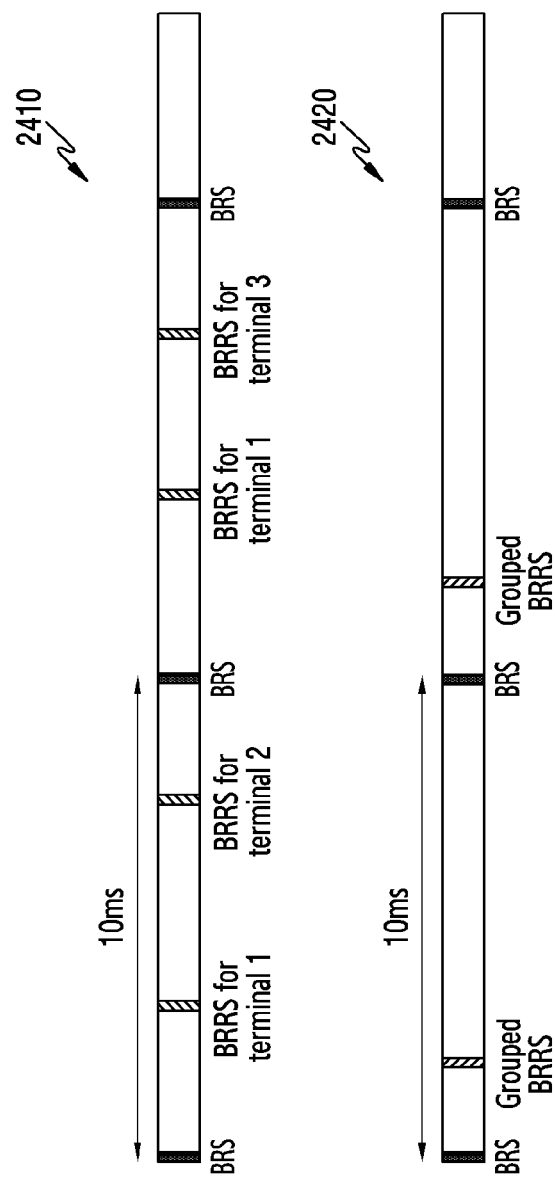
FIG. 24 illustrates examples of a time point at which the BRRS procedure is performed in a wireless communication system according to various embodiments of the disclosure.

FIG. 24 illustrates examples of a time point at which the BRRS procedure is performed in a wireless communication system according to various embodiments of the disclosure. In FIG. 24, reference numeral 2410 indicates the case in which the BRRS procedure is performed for an individual terminal, and reference numeral 2420 indicates the case in which the BRRS procedure is performed for a terminal group.

Referring to the situation 2410 of FIG. 24, BRRS procedures for terminal 1, terminal 2, and terminal 3 are individually performed. When a channel state of the terminal deteriorates, for example, when reference signal received power (RSRP) is reduced, the BS or the terminal may trigger the BRRS procedure. The BRRS procedure is performed between BRS procedures, and the BRRS is transmitted through a data channel. Accordingly, when BRRS procedures are individually performed for a plurality of terminals, big overhead may be generated.

On the other hand, referring to the situation 2420, a grouped BRRS is transmitted for a BRRS procedure for a terminal group. That is, the BS periodically transmits grouped BRRSs through a transmission beam allocated to terminals having high-speed mobility. Since the grouped BRRS procedure is performed for a plurality of terminals, the entire overhead may be reduced compared to the case in which the BRRS procedures are individually performed for the terminals.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-rom (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the present invention are not limited to a single element or multiple elements thereof. Further, either multiple elements expressed in the description may be configured into a single element or a single element in the description may be configured into multiple elements.

While the present invention has been shown and described with reference to certain embodiments thereof, it will be understood by those skilled in the art that various changes in form and details may be made therein without departing from the scope of the present invention. Therefore, the scope of the disclosure should not be defined as being limited to the embodiments, but should be defined by the appended claims and equivalents thereof.

The invention claimed is:

1. A method of operating a base station (BS) in a wireless communication system, the method comprising:
   transmitting first type reference signals;
   receiving feedback information of the first type reference signals;
   identifying a time interval between a first beam change to a first transmission beam and a second beam change to a second transmission beam from the first transmission beam according to the feedback information; and
   in case that the time interval is smaller than or equal to a threshold, transmitting second type reference signals through allocated resources,
   wherein the second type reference signals are transmitted using the second transmission beam of the BS.

2. The method of claim 1, further comprising:
   in case that a transmission beam before the first beam change to the first transmission beam is different from the second transmission beam, transmitting, to at least one terminal, control information indicating the allocated resources for the second type reference signals.

3. The method of claim 1, further comprising:
   in case that the first transmission beam and the second transmission beam are provided by different cells, transmitting, to at least one terminal, control information indicating the allocated resources for the second type reference signal.

4. The method of claim 1, further comprising:
   determining a group of terminals, based on at least one of geographic information of coverage and mobility information of terminals; and transmitting the second type reference signals through equal resources to the terminals belonging to the group.

5. The method of claim 4, wherein the terminals belonging to the group comprise terminals determining a transmission beam covering at least a port of a road as an optimal downlink transmission beam.

6. The method of claim 1, wherein information on the allocated resources for second type reference signals includes information indicating a location of a subframe for transmitting the second type reference signal, a symbol location, a subcarrier location and an antenna port.

7. An apparatus of a base station (BS) in a wireless communication system, the apparatus comprising:
a transceiver; and
at least one processor operably coupled to the transceiver, and configured to:
transmit first type reference signals;
receive feedback information of the first type reference signals;
identify a time interval between a first beam change to a first transmission beam and a second beam change to a second transmission beam from the first transmission beam according to the feedback information; and
in case that the time interval is smaller than or equal to a threshold, transmit second type reference signals through allocated resources,
wherein the second type reference signals are transmitted using the second transmission beam of the BS.

8. The apparatus of claim 7, wherein the at least one processor further configured to:
in case that a transmission beam before the first beam change to the first transmission beam is different from the second transmission beam, transmit, to at least one terminal, control information indicating the allocated resources for the second type reference signal.

9. The apparatus of claim 7, wherein the at least one processor further configured to:
in case that the first transmission beam and the second transmission beam are provided by different cells, transmit, to at least one terminal, control information indicating the allocated resources for the second type reference signal.

10. The apparatus of claim 7, wherein the at least one processor further configured to:
determine a group of terminals, based on at least one of geographic information of coverage and mobility information of terminals; and
transmit the second type reference signals through equal resources to the terminals belonging to the group.

11. The apparatus of claim 10, wherein the terminals belonging to the group comprise terminals determining a transmission beam covering at least a port of a road as an optimal downlink transmission beam.

12. The apparatus of claim 7, wherein information on the allocated resources for second type reference signals includes information indicating a location of a subframe for transmitting the second type reference signal, a symbol location, a subcarrier location and an antenna port.

13. An apparatus of a terminal in a wireless communication system, the apparatus comprising:
a transceiver; and
at least one processor operably coupled to the transceiver, and configured to:
receive first type reference signals;
transmit feedback information of the first type reference signals; and
receive second type reference signals through allocated resources in case that a time interval is smaller than or equal a threshold,
wherein the time interval is identified between a first beam change to a first transmission beam and a beam change to a second transmission beam from the first transmission beam according to the feedback information, and
wherein the second type reference signals are transmitted using a fixed transmission beam of a base station (BS).

14. The apparatus of claim 13, wherein the at least one processor further configured to:
in case that a transmission beam before the first beam change to the first transmission beam is different from the second transmission beam, transmit a signal, which makes a request for transmitting the second type reference signal, and receive control information indicating the allocated resources to at least one terminal for the second type reference signals.

15. The apparatus of claim 13, wherein the at least one processor further configured to:
in case that the first transmission beam and the second transmission beam are provided by different cells, transmit a signal, which makes a request for transmitting the second type reference signal, and receive control information indicating the allocated resources to at least one terminal for the second type reference signals.

16. The apparatus of claim 13, wherein information on the allocated resources for second type reference signals includes information indicating a location of a subframe for transmitting the second type reference signal, a symbol location, a subcarrier location and an antenna port.

* * * * *